(12) United States Patent
Weinberger et al.

(10) Patent No.: US 11,583,832 B2
(45) Date of Patent: Feb. 21, 2023

(54) MANGANESE OXIDE BASED CATALYST AND CATALYST DEVICE FOR THE REMOVAL OF FORMALDEHYDE AND VOLATILE ORGANIC COMPOUNDS

(71) Applicant: BASF Corporation, Florham Park, NJ (US)

(72) Inventors: David Weinberger, Philadelphia, PA (US); Wolfgang Ruettinger, East Windsor, NJ (US); Pascaline Tran, Holmdel, NJ (US); Laif Alden, Feasterville, PA (US); Ting Gu, Shanghai (CN); Feng Zhao, Shanghai (CN); Anju Shi, Shanghai (CN); Nils Lawrenz, Schifferstadt (DE); Lukas Wengeler, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/780,213

(22) Filed: Feb. 3, 2020

(65) Prior Publication Data
US 2020/0171464 A1 Jun. 4, 2020

Related U.S. Application Data

(63) Continuation of application No. 16/309,666, filed as application No. PCT/US2017/036942 on Jun. 12, 2017, now Pat. No. 11,203,009.

(Continued)

(51) Int. Cl.
*B01J 23/34* (2006.01)
*B01D 53/86* (2006.01)
(Continued)

(52) U.S. Cl.
CPC .......... *B01J 23/34* (2013.01); *B01D 53/8668* (2013.01); *B01D 53/8675* (2013.01); *B01J 20/18* (2013.01);
(Continued)

(58) Field of Classification Search
CPC ...... B01J 23/34; B01J 20/226; B01J 35/1004; B01J 20/20; B01J 20/18; B01J 20/2803;
(Continued)

(56) References Cited

U.S. PATENT DOCUMENTS

| 3,381,454 A | 5/1968 | Sponsel et al. |
| 4,200,609 A | 4/1980 | Byrd |

(Continued)

FOREIGN PATENT DOCUMENTS

| CN | 104772109 | 7/2015 |
| KR | 101610757 | 4/2016 |

(Continued)

OTHER PUBLICATIONS

Chemical sources B2B- (C) 2000-2012—Attagel (R) 50 (Year: 2022).*

(Continued)

*Primary Examiner* — Huy Tram Nguyen
(74) *Attorney, Agent, or Firm* — Lowenstein Sandler LLP

(57) ABSTRACT

Disclosed herein are a catalyst composition, catalyst devices, and methods for removing formaldehyde, volatile organic compounds, and other pollutants from an air flow stream. The catalyst composition including manganese oxide, optionally one or more of alkali metals, alkaline earth metals, zinc, iron, binder, an inorganic oxide, or carbon.

16 Claims, 10 Drawing Sheets

Related U.S. Application Data

(60) Provisional application No. 62/509,633, filed on May 22, 2017, provisional application No. 62/357,007, filed on Jun. 30, 2016.

(51) Int. Cl.

| | | |
|---|---|---|
| *B01J 20/18* | (2006.01) | |
| *B01J 35/10* | (2006.01) | |
| *B01J 37/04* | (2006.01) | |
| *B01J 21/04* | (2006.01) | |
| *B01J 37/00* | (2006.01) | |
| *B01J 35/00* | (2006.01) | |
| *B01J 37/02* | (2006.01) | |
| *B01J 20/28* | (2006.01) | |
| *B01J 20/20* | (2006.01) | |
| *B01J 20/22* | (2006.01) | |
| *B01J 35/04* | (2006.01) | |
| *B01J 37/08* | (2006.01) | |
| *B01J 21/06* | (2006.01) | |
| *B01J 23/10* | (2006.01) | |
| *B01J 21/18* | (2006.01) | |
| *B01J 21/08* | (2006.01) | |
| *B01J 35/02* | (2006.01) | |
| *B01J 21/16* | (2006.01) | |

(52) U.S. Cl.
CPC ............ *B01J 20/20* (2013.01); *B01J 20/226* (2013.01); *B01J 20/2803* (2013.01); *B01J 21/04* (2013.01); *B01J 35/0033* (2013.01); *B01J 35/04* (2013.01); *B01J 35/1004* (2013.01); *B01J 35/1009* (2013.01); *B01J 35/1014* (2013.01); *B01J 35/1019* (2013.01); *B01J 35/1033* (2013.01); *B01J 35/1038* (2013.01); *B01J 35/1042* (2013.01); *B01J 35/1047* (2013.01); *B01J 37/0009* (2013.01); *B01J 37/0018* (2013.01); *B01J 37/0201* (2013.01); *B01J 37/0215* (2013.01); *B01J 37/0225* (2013.01); *B01J 37/04* (2013.01); *B01J 37/08* (2013.01); *B01D 53/86* (2013.01); *B01D 2255/2065* (2013.01); *B01D 2255/2073* (2013.01); *B01D 2255/20715* (2013.01); *B01D 2257/106* (2013.01); *B01D 2257/502* (2013.01); *B01D 2257/708* (2013.01); *B01D 2258/06* (2013.01); *B01J 21/063* (2013.01); *B01J 21/066* (2013.01); *B01J 21/08* (2013.01); *B01J 21/16* (2013.01); *B01J 21/18* (2013.01); *B01J 23/10* (2013.01); *B01J 35/026* (2013.01)

(58) Field of Classification Search
CPC B01J 37/0201; B01J 37/0215; B01J 35/0033; B01J 37/0009; B01J 35/1033; B01J 37/08; B01J 37/0225; B01J 35/1009; B01J 35/04; B01J 37/0018; B01J 35/1047; B01J 35/1042; B01J 35/1038; B01J 35/1019; B01J 35/1014; B01J 21/04; B01J 37/04; B01J 21/16; B01J 35/026; B01J 21/066; B01J 21/08; B01J 21/18; B01J 23/10; B01J 21/063; B01J 37/038; B01J 35/1028; B01J 35/1023; B01D 53/8675; B01D 53/8668; B01D 2257/502; B01D 2258/06; B01D 53/86; B01D 2257/708; B01D 2257/106; B01D 2255/20715; B01D 2255/2065; B01D 2255/2073; B01D 2255/9205; B01D 2257/704; B01D 2255/702; B01D 53/72; B01D 53/66
USPC ........................................................ 422/122
See application file for complete search history.

(56) References Cited

U.S. PATENT DOCUMENTS

| | | |
|---|---|---|
| 4,290,923 A | 9/1981 | Mein et al. |
| 5,187,137 A | 2/1993 | Terui et al. |
| 5,296,435 A | 3/1994 | Kitaguchi et al. |
| 2002/0090261 A1 | 7/2002 | Sansalone |
| 2003/0091499 A1 | 5/2003 | Becue et al. |
| 2003/0166466 A1* | 9/2003 | Hoke ............... B01J 20/12 502/439 |
| 2005/0169826 A1 | 8/2005 | Li et al. |
| 2007/0060472 A1 | 3/2007 | Fisher et al. |
| 2010/0004119 A1 | 1/2010 | Gadkaree et al. |
| 2010/0111793 A1 | 5/2010 | Mori et al. |
| 2010/0178562 A1 | 7/2010 | Exnar et al. |
| 2011/0038771 A1 | 2/2011 | Buelow et al. |
| 2011/0136656 A1 | 6/2011 | Nariyuki et al. |
| 2014/0255283 A1* | 9/2014 | Sidheswaran ........... C09D 1/00 423/245.1 |
| 2015/0031923 A1 | 1/2015 | Shen et al. |
| 2015/0118116 A1 | 4/2015 | Buelow et al. |
| 2015/0315048 A1 | 6/2015 | Tlirado |

FOREIGN PATENT DOCUMENTS

| | | |
|---|---|---|
| WO | 9948596 | 9/1999 |
| WO | 2001054801 | 8/2001 |
| WO | 2015066272 | 5/2015 |
| WO | 2016069856 | 5/2016 |

OTHER PUBLICATIONS

Meera A. Sidheswaran et al., "Quantitative room-temperature mineralization of airborne formaldehyde using manganese oxide catalysts", Applied Catalysis B: Environmental, Elsevier, Amsterdam, NL, vol. 107, No. 1, Jun. 20, 2011, pp. 34-41, 8 pages.

Kim SC et al:Catalytic combustion of VOCs over a series of manganese oxide catalysts, Applied Catalysis B: Environmental, Elsevier, Amsterdam, NL, vol. 98, No. 3-4, Aug. 1, 2010, pp. 180-185, 6 pages.

International Search Report & Written Opinion for International Application No. PCT/US2017/036942 dated Oct. 27, 2017, 16 pages.

Dong, Y et al. "Simple Hydrothermal Preparation of α-, β-, and γ-MnO2 and Phase Sensitivity in Catalytic Ozonation", 2014, vol. 4, No. 74, Absliact only, RSC Advances, 2 pages.

Tomas Schutz et al., "Cadmium Adsorption on Manganese Modified Bentonite and Bentonite-Quartz Sand Blend", International Journal of Mineral Processing, vol. 150, pp. 32-38, 2016, 7 pages.

* cited by examiner

MANGANESE OXIDE BASED CATALYST AND CATALYST DEVICE FOR THE REMOVAL OF FORMALDEHYDE AND VOLATILE ORGANIC COMPOUNDS

CROSS-REFERENCE TO RELATED APPLICATIONS

This application is a continuation of U.S. Non-Provisional patent application Ser. No. 16/309,666, filed Dec. 13, 2018, which is a National Phase entry of International Application No. PCT/US2017/036942, filed Jun. 12, 2017, which claims the benefit of priority of U.S. Provisional Patent Application No. 62/509,633, filed May 22, 2017, and U.S. Provisional Patent Application No. 62/357,007, filed Jun. 30, 2016, all which are hereby incorporated by reference herein in their entireties.

TECHNICAL FIELD

The present disclosure relates to compositions, devices, and methods for air purification. More particularly, the disclosure relates to a manganese oxide based catalyst composition, catalyst device, method of their preparation, and methods for removing formaldehyde and volatile organic compounds from air supplies.

BACKGROUND

Atmospheric pollution is a concern of increasing importance as the levels of various atmospheric pollutants continue to increase. One primary pollutant of concern is formaldehyde (HCOH). It is regarded as a major indoor pollutant emitted from widely used building and decorative materials. Long term exposure to formaldehyde is considered to be carcinogenic.

Several cities in China, including Shanghai, Hangzhou, Suzhou, Nanjing, Wuhan, Chongqing, and Chengdu, were inspected in 2011 by the Indoor Environment and the Health Branch of China Environmental Science Institute with respect to the formaldehyde concentration present therein. Although the national standard sets a formaldehyde concentration limit of 0.1 mg/m$^3$, each of the cities inspected had a formaldehyde concentration level significantly higher than the national limit. The levels ranged from 15% to 40% higher than the national standard.

There continues to be a need for devices, methods, and compositions that can effectively treat pollution from formaldehyde and other volatile organic compounds (VOCs). These devices, methods, and compositions should exhibit long term performance, efficient manufacturing operations, and reduced production costs.

SUMMARY

Disclosed herein are compositions, devices, and methods for purifying an air supply contaminated with formaldehyde and volatile organic compounds. Also disclosed herein are methods for producing the catalyst compositions and catalyst devices.

In some embodiments, the invention is directed to a catalyst composition comprising manganese oxide. In some embodiments, the manganese oxide in the catalyst composition may comprise cryptomelane, birnessite, vernadite, manganese oxide polymorph I, poorly crystalline cryptomelane, pyralusite, nsutite, amorphous manganese oxide, polymorphs thereof, or mixtures thereof.

In some embodiments, the catalyst composition comprises manganese oxide, wherein the manganese oxide exhibits an XRD spectrum in the range of 20 to 80°2θ characterized by at least the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20%. |

In some embodiments, the catalyst composition comprises manganese oxide, wherein the manganese oxide exhibits an XRD spectrum in the range of 20 to 80°2θ characterized by the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20%; | and wherein other peaks may be present at a relative intensity lower than 20%.

In other embodiments, the catalyst composition comprises manganese oxide, wherein the manganese oxide exhibits an XRD spectrum in the range of 20 to 80°2θ characterized solely by the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20%. |

In some embodiments, the catalyst composition may further comprise one or more of an alkali metal, an alkaline earth metal, zinc, iron, an inorganic oxide, a binder, activated carbon, or combinations thereof.

In some embodiments, the catalyst composition may be in the form of extrudates. In other embodiments, the catalyst composition may be in a form of a coating layer disposed on a solid substrate.

In some embodiments, the catalyst composition may comprises a BET surface area ranging from about 5 m$^2$/g to about 2000 m$^2$/g, from about 10 m$^2$/g to about 2000 m$^2$/g, from about 15 m$^2$/g to about 2000 m$^2$/g, from about 20 m$^2$/g to about 2000 m$^2$/g, from about 25 m$^2$/g to about 2000 m$^2$/g, from about 30 m$^2$/g to about 2000 m$^2$/g, from about 35 m$^2$/g to about 2000 m$^2$/g, from about 40 m$^2$/g to about 2000 m$^2$/g, from about 45 m$^2$/g to about 2000 m$^2$/g, from about 5 m$^2$/g to about 1500 m$^2$/g, from about 5 m$^2$/g to about 1300 m$^2$/g, from about 5 m$^2$/g to about 1100 m$^2$/g, from about 5 m$^2$/g to about 1000 m$^2$/g, from about 5 m$^2$/g to about 750 m$^2$/g, from about 5 m$^2$/g to about 500 m$^2$/g, from about 5 m$^2$/g to about 400 m$^2$/g, from about 5 m$^2$/g to about 300 m$^2$/g, from about 5 m$^2$/g to about 200 m$^2$/g, from about 5 m$^2$/g to about 150 m²/g, from about 5 m²/g to about 100 m²/g, from about 5 m²/g to about 75 m²/g, from about 5 m²/g to about 50 m²/g, from about 5 m²/g to about 30 m²/g, from about 50 m²/g to about 2000 m²/g, from about 100 m²/g to about 2000 m²/g, from about 150 m²/g to about 2000 m²/g, from about 170 m²/g to about 2000 m²/g, from about 50 m²/g to about 1500 m²/g, from about 100 m²/g to about 1500 m²/g, from about 150 m²/g to about 1500 m²/g, from about 170 m²/g to about 1500 m²/g, from about 50 m²/g to about 1300 m²/g, from about 100 m²/g to about 1300 m²/g, from about 150 m²/g to about 1300 m²/g, from about 170 m²/g to about 1300 m²/g, from about 50 m²/g to about 1100 m²/g, from about 100 m²/g to about 1100 m²/g, from about 150 m²/g to about 1100 m²/g, from about 170 m²/g to about 1100 m²/g, from about 50 m²/g to about 1000 m²/g, from about 100 m²/g to about 1000 m²/g, from about 150 m²/g to about 1000 m²/g, from about 170 m²/g to about 1000 m²/g, from about 100 m²/g to about 500 m²/g, from about 100 m²/g to about 400 m²/g, from about 100 m²/g to about 350 m²/g, from about 100 m²/g to about 300 m²/g, or from about 100 m²/g to about 250 m²/g, from about 150 m²/g to about 500 m²/g, from about 150 m²/g to about 400 m²/g, from about 150 m²/g to about 350 m²/g, from about 150 m²/g to about 300 m²/g, or from about 150 m²/g to about 250 m²/g. In some embodiments, the BET surface area ranges from about 70 m²/g to 150 m²/g, from about 70 m²/g to 125 m²/g, from about 70 m²/g to 100 m²/g, from about 50 m²/g to 150 m²/g, from about 50 m²/g to 125 m²/g, from about 50 m²/g to 100 m²/g, from about 50 m²/g to 80 m²/g, from about 25 m²/g to 150 m²/g, from about 25 m²/g to 125 m²/g, from about 25 m²/g to 100 m²/g, from about 25 m²/g to 70 m²/g, from about 10 m²/g to 150 m²/g, from about 10 m²/g to 125 m²/g, from about 10 m²/g to 100 m²/g, from about 10 m²/g to 70 m²/g, from about 10 m²/g to 50 m²/g, from about 5 m²/g to 150 m²/g, from about 5 m²/g to 125 m²/g, from about 5 m²/g to 100 m²/g, from about 5 m²/g to 70 m²/g, from about 5 m²/g to 50 m²/g, from about 5 m²/g to 25 m²/g, or from about 5 m²/g to 10 m²/g.

In some embodiments, the catalyst composition may be porous with pore volumes ranging from about 0.3 mL/g to about 1.5 mL/g, from about 0.3 mL/g to about 1.0 mL/g, from about 0.3 mL/g to about 0.9 mL/g or from about 0.5 mL/g to about 0.75 mL/g.

In some embodiments, the invention is directed to a catalyst device for purifying an air supply. In some embodiments, the device comprises a catalyst or a catalytic adsorbent. The catalyst device may comprise a housing and a catalyst composition disposed in the housing. The catalyst composition in the catalyst device may be any of the catalyst compositions disclosed herein. The catalyst device may further comprise an inlet port configured to receive unpurified air into an interior of the housing and an outlet port configured to deliver purified air from the housing. The catalyst device may be configured to contact the unpurified air with the catalyst composition, such that the formaldehyde and/or the volatile organic compounds present in the unpurified air are removed upon contact with the catalyst composition.

In some embodiments, the invention is directed to a method of preparing an extruded catalyst. The method for preparing an extruded catalyst may comprise mixing manganese oxide, water, and optionally one or more of an alkali metal, an alkaline earth metal, zinc, iron, an inorganic oxide (such as rare earth oxides), a binder, activated carbon, or combinations thereof, to form an extrudable paste. The method may further comprise extruding the paste to form any of the catalyst compositions disclosed herein.

In other embodiments, the invention is directed to a method of preparing a catalyst composition disposed onto a substrate. The method for preparing a catalyst composition disposed onto a substrate may comprise dispersing manganese and optionally one or more of an alkali metal, an alkaline earth metal, zinc, iron, an inorganic oxide, a binder, activated carbon, or combinations thereof, in water to form a catalyst composition slurry. The method may further comprise coating the catalyst composition onto the substrate. The catalyst composition disposed on the substrate may be any of the catalyst compositions disclosed herein.

In some embodiments, the invention is directed to a method for purifying an air flow stream by contacting the unpurified air flow stream with a catalyst composition according to the invention to produce a purified air flow stream.

The catalyst composition, catalyst device, and methods for purifying air streams according to the invention may all be configured to remove one or more of formaldehyde, ozone, carbon monoxide, nitrogen oxides, amines, sulfur compounds, thiols, chlorinated hydrocarbons, or volatile organic compounds from an unpurified air supply.

As used herein, the terms "stream" or "flow" broadly refer to any flowing gas that may contain solids (e.g., particulates), liquids (e.g., vapor), and/or gaseous mixtures.

The terms "unpurified air" or "unpurified air stream" refers to any stream that contains one or more pollutants at a concentration or content at or above a level that is perceived as nuisance or is considered to have adverse effects on human health (including short term and/or long term effects). For example, in some embodiments, a stream that contains formaldehyde at a concentration greater than 0.5 part formaldehyde per million parts of air stream calculated as an eight hour time weighted average concentration pursuant to "action level" standards set forth by the Occupational Safety & Health Administration is an unpurified air stream. In some embodiments, a stream that contains formaldehyde at a concentration greater than 0.08 part formaldehyde per million parts of air stream calculated as an eight hour time weighted average concentration pursuant to national standards in China is an unpurified air stream. Unpurified air may include, but is not limited to, formaldehyde, ozone, carbon monoxide (CO), volatile organic compounds (VOCs), methyl bromide, water, amines, and nitrogen oxides.

The term "VOCs" refers to organic chemical molecules having an elevated vapor pressure at room temperature. Such chemical molecules have a low boiling point and a large number of the molecules evaporate and/or sublime at room temperature, thereby transitioning from a liquid or solid phase to a gas phase. Common VOCs include, but are not limited to, benzene, toluene, xylene, ethylbenzene, styrene, propane, hexane, cyclohexane, limonene, pinene, acetaldehyde, hexaldehyde, ethyl acetate, butanol, and the like.

The terms "purified air" or "purified air stream" refer to any stream that contains one or more pollutants at a concentration or content that is lower than the concentration or content of that one or more pollutants in the unpurified air stream.

The term "substrate" refers to a material (e.g., a metal, semi-metal, semi-metal oxide, metal oxide, polymeric, ceramic) onto or into which the catalyst is placed. In some embodiments, the substrate may be in the form of a solid surface having a washcoat containing a plurality of catalytic particles. A washcoat may be formed by preparing a slurry containing a specified solids content (e.g., 30-50% by weight) of catalytic particles, which is then coated onto a substrate and dried to provide a washcoat layer. In some embodiments, the substrate may be porous and the washcoat may be deposited outside and/or inside the pores.

The term "nitrogen oxide" refers to compounds containing nitrogen and oxygen including but not limited to, nitric oxide, nitrogen dioxide, nitrous oxide, nitrosylazide, ozatetrazole, dinitrogen trioxide, dinitrogen tetroxide, dinitrogen pentoxide, trinitramide, nitrite, nitrate, nitronium, nitrosonium, peroxonitrite, or combinations thereof.

The term "sulfur compounds" refers to compounds containing sulfur including but not limited to sulfur oxides (sulfur monoxide, sulfur dioxide, sulfur trioxide, disulfur monoxide, disulfur dioxide), hydrogen sulfide, or combinations thereof.

The term "manganese oxide polymorph I" refers to a manganese oxide in a semi-crystalline phase exhibiting an XRD spectrum in the range of 20 to 80°2θ characterized by the following °2θ peaks and intensities. $Cu_{k\alpha}$ radiation was used in the analysis with generator settings of 45 kV and 40 mA.

| °2θ | Relative Intensity (%) |
|---|---|
| 36-38 | 100% |
| 41-43 | >20% |
| 56-58 | <50% |
| 65-67 | >20% |

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1A:
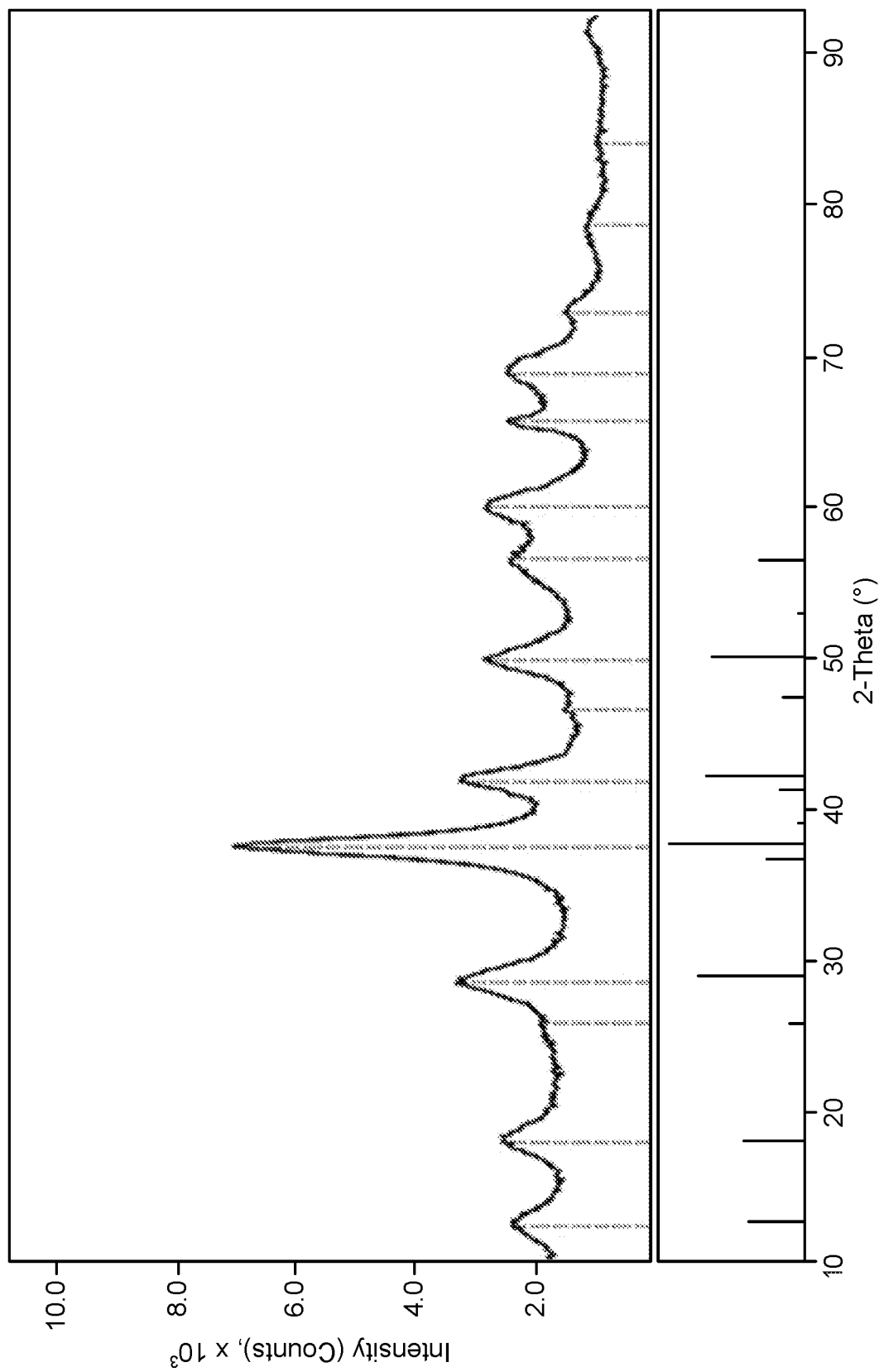
FIG. 1A depicts an x-ray diffraction pattern for cryptomelane manganese oxide.

The present disclosure relates to catalyst compositions, catalyst devices, methods of their preparation, and methods of their use for treating a flow of ambient air by converting and/or removing contaminants therefrom. Contaminants may comprise one or more of formaldehyde, ozone, carbon monoxide, nitrous oxide, amines, sulfur compounds, thiols, chlorinated hydrocarbons, or volatile organic compounds in unpurified air flow streams. The contaminants may be converted into less harmful compounds such as oxygen, carbon dioxide and water vapor. The catalyst composition may be manganese oxide based and may further comprise one or more of an alkali metal, an alkaline earth metal, zinc, iron, an inorganic oxide, a binder, activated carbon, or combinations thereof. The catalyst composition may be in the form of a plurality of extruded particles or may be disposed on a substrate as a coating layer. The catalyst composition may be disposed in a housing to form a catalyst device which may further comprise and inlet and an outlet port such that unpurified air enters the catalyst device through the inlet port, the unpurified air is contacted with the catalyst composition in the housing, thereby forming a purified air stream which may exit the catalyst device through an outlet port. The purified air may contain reduced levels of contaminants.

Catalyst Composition Embodiments

In some embodiments, the present invention may be directed to a catalyst composition comprising manganese oxide, wherein the catalyst composition comprises a BET surface area ranging from about from about 5 $m^2/g$ to about 2000 $m^2/g$, from about 10 $m^2/g$ to about 2000 $m^2/g$, from about 15 $m^2/g$ to about 2000 $m^2/g$, from about 20 $m^2/g$ to about 2000 $m^2/g$, from about 25 $m^2/g$ to about 2000 $m^2/g$, from about 30 $m^2/g$ to about 2000 $m^2/g$, from about 35 $m^2/g$ to about 2000 $m^2/g$, from about 40 $m^2/g$ to about 2000 $m^2/g$, from about 45 $m^2/g$ to about 2000 $m^2/g$, from about 5 $m^2/g$ to about 1500 $m^2/g$, from about 5 $m^2/g$ to about 1300 $m^2/g$, from about 5 $m^2/g$ to about 1100 $m^2/g$, from about 5 $m^2/g$ to about 1000 $m^2/g$, from about 5 $m^2/g$ to about 750 $m^2/g$, from about 5 $m^2/g$ to about 500 $m^2/g$, from about 5 $m^2/g$ to about 400 $m^2/g$, from about 5 $m^2/g$ to about 300 $m^2/g$, from about 5 $m^2/g$ to about 200 $m^2/g$, from about 5 $m^2/g$ to about 150 $m^2/g$, from about 5 $m^2/g$ to about 100 $m^2/g$, from about 5 $m^2/g$ to about 75 $m^2/g$, from about 5 $m^2/g$ to about 50 $m^2/g$, from about 5 $m^2/g$ to about 30 $m^2/g$, from about 50 $m^2/g$ to about 2000 $m^2/g$, from about 100 $m^2/g$ to about 2000 $m^2/g$, from about 150 $m^2/g$ to about 2000 $m^2/g$, from about 170 $m^2/g$ to about 2000 $m^2/g$, from about 50 $m^2/g$ to about 1500 $m^2/g$, from about 100 $m^2/g$ to about 1500 $m^2/g$, from about 150 $m^2/g$ to about 1500 $m^2/g$, from about 170 $m^2/g$ to about 1500 $m^2/g$, from about 50 $m^2/g$ to about 1300 $m^2/g$, from about 100 $m^2/g$ to about 1300 $m^2/g$, from about 150 $m^2/g$ to about 1300 $m^2/g$, from about 170 $m^2/g$ to about 1300 $m^2/g$, from about 50 $m^2/g$ to about 1100 $m^2/g$, from about 100 $m^2/g$ to about 1100 $m^2/g$, from about 150 $m^2/g$ to about 1100 $m^2/g$, from about 170 $m^2/g$ to about 1100 $m^2/g$, from about 50 $m^2/g$ to about 1000 $m^2/g$, from about 100 $m^2/g$ to about 1000 $m^2/g$, from about 150 $m^2/g$ to about 1000 $m^2/g$, from about 170 $m^2/g$ to about 1000 $m^2/g$, from about 100 $m^2/g$ to about 500 $m^2/g$, from about 100 $m^2/g$ to about 400 $m^2/g$, from about 100 $m^2/g$ to about 350 $m^2/g$, from about 100 $m^2/g$ to about 300 $m^2/g$, or from about 100 $m^2/g$ to about 250 $m^2/g$, from about 150 $m^2/g$ to about 500 $m^2/g$, from about 150 $m^2/g$ to about 400 $m^2/g$, from about 150 $m^2/g$ to about 350 $m^2/g$, from about 150 $m^2/g$ to about 300 $m^2/g$, or from about 150 $m^2/g$ to about 250 $m^2/g$. In some embodiments, the BET surface area ranges from about 70 $m^2/g$ to 150 $m^2/g$, from about 70 $m^2/g$ to 125 $m^2/g$, from about 70 $m^2/g$ to 100 $m^2/g$, from about 50 $m^2/g$ to 150 $m^2/g$, from about 50 m²/g to 125 m²/g, from about 50 m²/g to 100 m²/g, from about 50 m²/g to 80 m²/g, from about 25 m²/g to 150 m²/g, from about 25 m²/g to 125 m²/g, from about 25 m²/g to 100 m²/g, from about 25 m²/g to 70 m²/g, from about 10 m²/g to 150 m²/g, from about 10 m²/g to 125 m²/g, from about 10 m²/g to 100 m²/g, from about 10 m²/g to 70 m²/g, from about 10 m²/g to 50 m²/g, from about 5 m²/g to 150 m²/g, from about 5 m²/g to 125 m²/g, from about 5 m²/g to 100 m²/g, from about 5 m²/g to 70 m²/g, from about 5 m²/g to 50 m²/g, from about 5 m²/g to 25 m²/g, or from about 5 m²/g to 10 m²/g. BET surface area, as referenced herein, is measured using $N_2$ as the adsorbate. The surface area is measured on an Ankersmit Quantachrome Autosorb-6 apparatus, after degassing samples at 180° C. to a pressure of 3.3 Pa (25 mTorr).

Figure 1B:
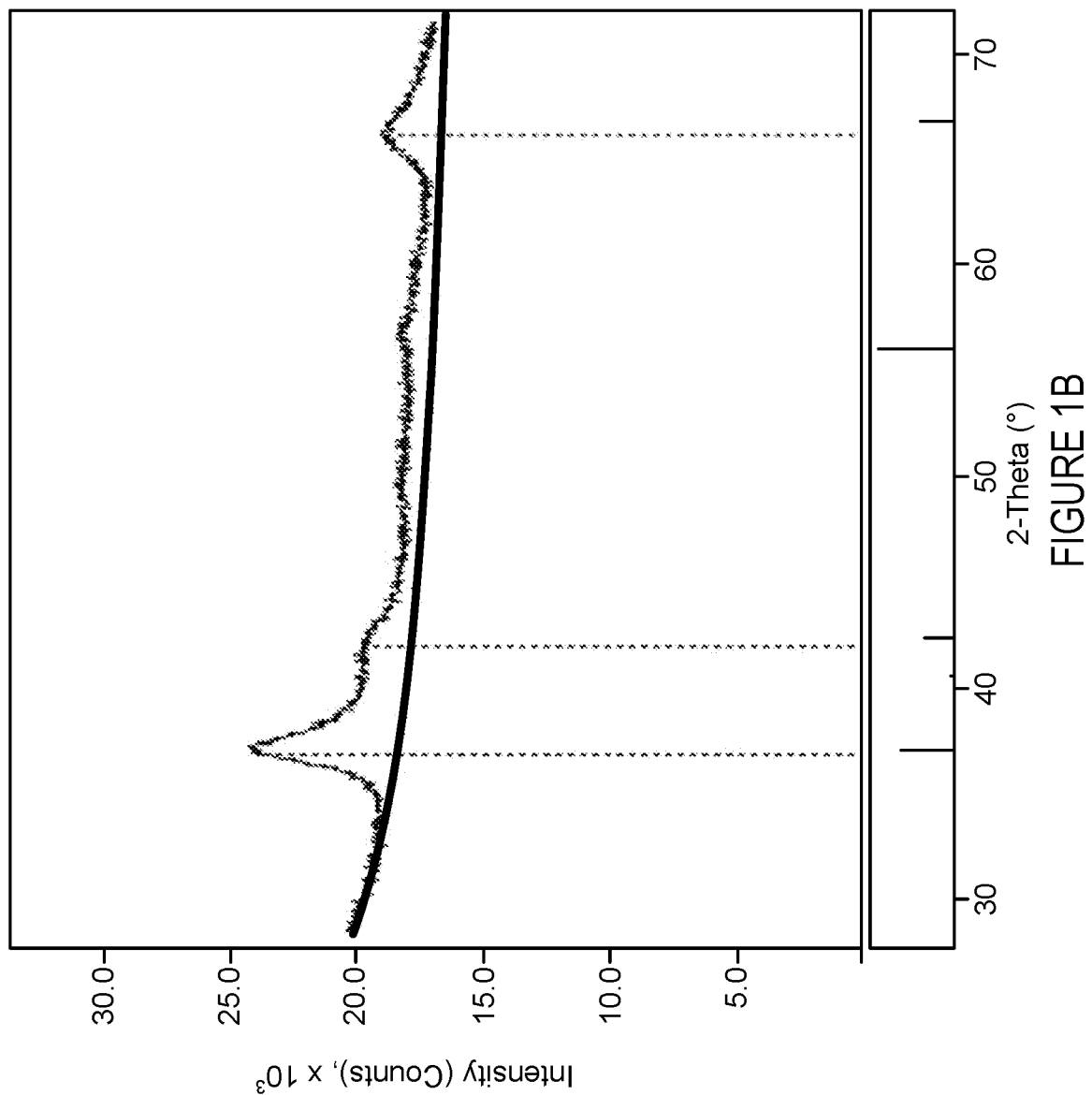
FIG. 1B depicts an x-ray diffraction pattern for manganese oxide polymorph I.
Figure 1C:
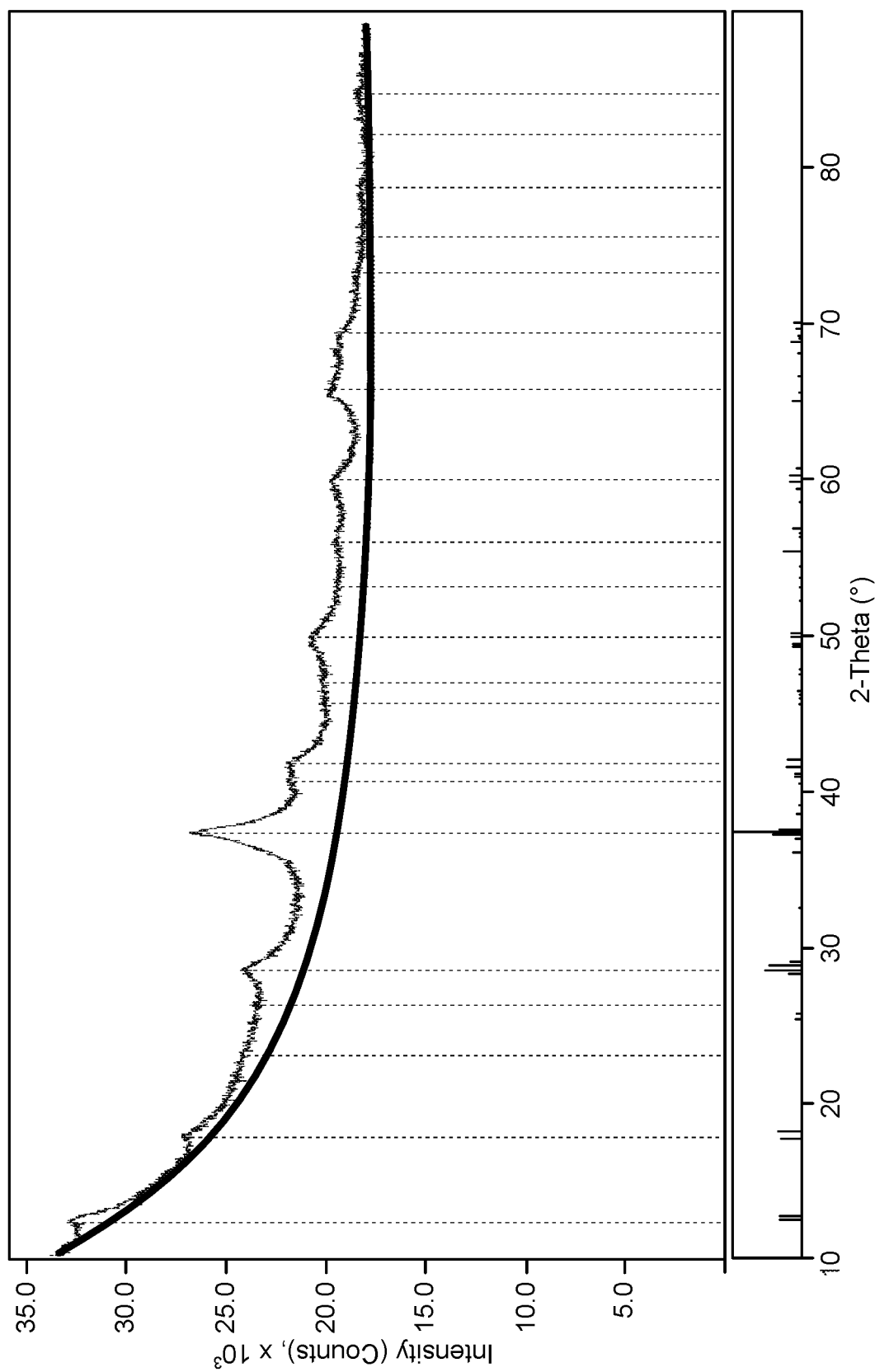
FIG. 1C depicts an x-ray diffraction pattern for poorly crystalline cryptomelane.

The manganese oxide in the catalyst composition may comprise cryptomelane, birnessite, vernadite, manganese oxide polymorph I, pyrolusite, nsutite, poorly crystalized cryptomelane, amorphous manganese oxide, polymorphs thereof, or mixtures thereof. The manganese oxide in the catalyst composition may be 100% crystalline, 100% amorphous, or partially crystalline and partially amorphous. X-Ray Diffraction (XRD) technique is utilized to determine the crystallinity of the manganese oxide in the catalyst composition. A catalyst composition may be deemed completely amorphous if a peak is absent from the XRD profile. Alternatively, a catalyst composition may be deemed at least partially crystalline if some peaks are observed in its XRD profile. Each type of manganese oxide may have a corresponding XRD profile. For example, cryptomelane manganese oxide may exhibit an XRD pattern illustrated in FIG. 1A; manganese oxide polymorph I may exhibit an XRD pattern illustrated in FIG. 1B; and a poorly crystalline cryptomelane manganese oxide may exhibit an XRD pattern illustrated in FIG. 1C.

When manganese oxide polymorph I is present in the catalyst composition, in some embodiments, the manganese oxide may exhibit an XRD pattern in the range of 20 to 80°2θ having at least the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20%. |

In other embodiments, when manganese oxide polymorph I is present in the catalyst composition, the manganese oxide may exhibit an XRD pattern in the range of 20 to 80°2θ having solely the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20%. |

In yet other embodiments, when manganese oxide polymorph I is present in the catalyst composition, the manganese oxide may exhibit an XRD pattern in the range of 20 to 80°2θ having the following °2θ peaks and intensities:

| °2θ | Relative Intensity (%) as compared to the main peak |
|---|---|
| 36-38 | 100% |
| 41-43 | >20% |
| 56-58 | <50% |
| 65-67 | >20% | wherein if additional peaks are present, the relative intensity of the additional peaks is less than 20%.

In some embodiments, the manganese oxide in the catalyst composition (regardless of the form it is in) may be present in an amount ranging from about 5 wt % to about 100 wt %, from about 10 wt % to about 90 wt %, or from about 15 wt % to about 75 wt %, from about 40 wt % to about 90 wt %, or from about 45 wt % to about 75 wt % based on total weight of the catalyst composition.

In some embodiments, the catalyst composition may further comprise a binder. In some embodiments, the binder may comprise alumina. In some embodiments, the binder may comprise a polymeric binder. In some embodiments, the binder may be one or more of alumina, zirconia, silica, aluminum phyllosilicate clay such as bentonite, or mixtures thereof. In some embodiments, the binders with low glass transition temperature may result in more flexible or less brittle catalyst compositions and may be preferred. In some embodiments, the chosen binder may be one that with 10 weight % binder (based on the total weight of the catalyst composition) enables 70% of the catalyst composition's activity as compared to the activity of a catalyst composition without a binder.

Examples of additional suitable binders may include, but not limited to, alumina sol, boehmite, silica sol, titania sol, zirconium acetate, and colloidal ceria sol. Examples of polymer binders may include but not be limited to, polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), fluorinated polymers such as poly(tetrafluoroethylene), polyvinylidene fluoride, poly(vinylfluoride) and chloro/fluoro copolymers such as ethylene chlorotrifluoroethylene copolymer, polyamide, phenolic resins, polyurethane, acrylic/styrene acrylic copolymer latex and silicone polymers.

In some embodiments, the binder in the catalyst composition may be present in an amount equal to about 60 wt % or less, equal to about 50 wt % or less, or equal to about 40 wt % or less, based on total weight of the catalyst composition.

In some embodiments, the catalyst composition may further comprise inorganic oxides. The inorganic oxides may be one or more of ceria, zirconia, silica, titania, alumina, iron, lanthanum, praseodymium, samarium, or mixtures thereof. In some embodiments, the inorganic oxide may be ceria. In some embodiments, the inorganic oxide may be zirconia. In some embodiments, the inorganic oxide may be silica.

In some embodiments, the inorganic oxide in the catalyst composition may be present in an amount equal to about 60 wt % or less, equal to about 50 wt % or less, equal to about 40 wt % or less based on total weight of the catalyst composition. In some embodiments, inorganic oxides may include rare earth oxides.

In some embodiments, the catalyst composition may further comprise one or more of an alkali metal, an alkaline earth metal, zinc, iron, or mixtures thereof. The one or more of an alkali metal, an alkaline earth metal, zinc, iron, or mixtures thereof may be present in the catalyst composition in an amount equal to about 10 wt % or less, equal to about 5 wt % or less, or equal to about 2 wt % or less based on the total weight of the catalyst composition.

In some embodiments, the catalyst composition may be in the form of a plurality of distinct extruded particles. The plurality of extruded particles may be of various shapes, such as, pellets, beads, extrudates, rings, spheres, cylinders, trilobe, and quadralobe shaped pieces. The plurality of extruded particles may vary in size, for example, the particles may have a mean diameter ranging from about 1 millimeter to about 15 millimeter.

In other embodiments, the catalyst composition may be disposed on a solid substrate, thereby forming a catalyst system. The loading of the catalyst composition on the substrate may range from about 0.5 g/in$^3$ to about 4 g/in$^3$. For example, the catalyst composition may be coated onto a solid substrate and may form a single coat of catalytic material on the solid substrate or a plurality of layers of catalytic material on the solid substrate. If a plurality of layers of catalytic material is coated on the solid substrate, the layers may vary in their compositions or alternatively all catalyst layers may have the same composition. In some embodiments, the solid substrate may comprise a polymer substrate, a ceramic substrate, a metallic substrate, a foam substrate, a paper substrate, or mixtures thereof.

In some embodiments, the substrate may be a nonwoven filter, a paper filter, a ceramic filter, or a fibrous filter. In some embodiments, the substrate may be a metallic foam substrate, a ceramic foam substrate, or a polymeric foam substrate. In some embodiments, the substrate may be a metallic monolithic substrate, a ceramic monolithic substrate, a paper monolithic substrate, a polymer monolithic substrate, or a ceramic fiber monolithic substrate. In some embodiments, the substrate may be an HVAC duct, an air filter, or a louver surface. In some embodiments, the substrate may be a portable air filter, or a filter disposed in a vehicle selected from the group consisting of motor vehicles, railed vehicle, watercrafts, aircrafts, and space crafts. In some embodiments the substrate may be absent altogether.

In some embodiments, the catalyst composition may further comprise a sorbent such as carbon, impregnated (treated) carbon, metal organic frameworks (MOFs), zeolites, or combinations thereof. In some embodiments, the catalyst composition may comprise activated carbon. In some embodiments, the sorbent may have optimal parameters, such as BET surface area, pore volume, bulk density, mass, volume, and diameter that will increase the sorbent's affinity to certain contaminants.

In some embodiments, the sorbent may comprise MOFs in a form of a powder, pellets, extrudates, granulates, or a free-standing film. In certain embodiments, the MOF is in the form of MOF particles. In some embodiments the adsorbent material is a zeolitic material having a framework structure composed of $YO_2$ and $X_2O_3$, in which Y is a tetravalent element and X is a trivalent element. In one embodiment Y is selected from the group consisting of Si, Sn, Ti, Zr, Ge, and combinations of two or more thereof. In one embodiment Y is selected from the group consisting of Si, Ti, Zr, and combinations of two or more thereof. In one embodiment Y is Si and/or Sn. In one embodiment Y is Si. In one embodiment X is selected from the group consisting of Al, B, In, Ga, and combinations of two or more thereof. In one embodiment X is selected from the group consisting of Al, B, In, and combinations of two or more thereof. In one embodiment X is Al and/or B. In one embodiment X is Al. In certain embodiments the zeolite is in a form of particles, pellets, extrudates, granulates, a powder, or a free-standing film. In certain embodiments the zeolite is in a form of zeolite particles.

In certain embodiments, the sorbent may be activated. The activation may include subjecting the sorbent to various conditions including, but not limited to, ambient temperature, vacuum, an inert gas flow, or any combination thereof, for sufficient time to activate the sorbent material.

In some embodiments, the catalyst composition is configured to remove one or more of formaldehyde, ozone, carbon monoxide, nitrogen oxides, amines, sulfur compounds, thiols, chlorinated hydrocarbons, or volatile organic compounds from an unpurified air supply.

In some embodiments, the catalyst composition may be porous and have pore volumes ranging from about 0.3 mL/g to about 1.5 mL/g, from about 0.3 mL/g to about 1.0 mL/g, from about 0.3 mL/g to about 0.9 mL/g, from about 0.5 mL/g to about 0.9 mL/g, or from about 0.5 mL/g to about 0.75 mL/g. Pore volume, as discussed herein, may refer to an average pore volume as measured by nitrogen porosimetry using, for example, the BJH (Barrett, Joyner and Halenda) method, or by mercury intrusion porosimetry. In the present disclosure, average pore volume is measured using the BJH method unless otherwise specified.

In some embodiments, the catalyst composition may consist essentially of one of the following: manganese oxide only, manganese oxide and a binder only, manganese oxide and an inorganic oxide only, or manganese oxide with a binder and an activated carbon only, and have a BET surface area from about 5 m$^2$/g to about 2000 m$^2$/g, from about 10 m$^2$/g to about 2000 m$^2$/g, from about 15 m$^2$/g to about 2000 m$^2$/g, from about 20 m$^2$/g to about 2000 m$^2$/g, from about 25 m$^2$/g to about 2000 m$^2$/g, from about 30 m$^2$/g to about 2000 m$^2$/g, from about 35 m$^2$/g to about 2000 m$^2$/g, from about 40 m$^2$/g to about 2000 m$^2$/g, from about 45 m$^2$/g to about 2000 m$^2$/g, from about 5 m$^2$/g to about 1500 m$^2$/g, from about 5 m$^2$/g to about 1300 m$^2$/g, from about 5 m$^2$/g to about 1100 m$^2$/g, from about 5 m$^2$/g to about 1000 m$^2$/g, from about 5 m$^2$/g to about 750 m$^2$/g, from about 5 m$^2$/g to about 500 m$^2$/g, from about 5 m$^2$/g to about 400 m$^2$/g, from about 5 m$^2$/g to about 300 m$^2$/g, from about 5 m$^2$/g to about 200 m$^2$/g, from about 5 m$^2$/g to about 150 m$^2$/g, from about 5 m$^2$/g to about 100 m$^2$/g, from about 5 m$^2$/g to about 75 m$^2$/g, from about 5 m$^2$/g to about 50 m$^2$/g, from about 5 m$^2$/g to about 30 m$^2$/g, from about 50 m$^2$/g to about 2000 m$^2$/g, from about 100 m$^2$/g to about 2000 m$^2$/g, from about 150 m$^2$/g to about 2000 m$^2$/g, from about 170 m$^2$/g to about 2000 m$^2$/g, from about 50 m$^2$/g to about 1500 m$^2$/g, from about 100 m$^2$/g to about 1500 m$^2$/g, from about 150 m$^2$/g to about 1500 m$^2$/g, from about 170 m$^2$/g to about 1500 m$^2$/g, from about 50 m$^2$/g to about 1300 m$^2$/g, from about 100 m$^2$/g to about 1300 m$^2$/g, from about 150 m$^2$/g to about 1300 m$^2$/g, from about 170 m$^2$/g to about 1300 m$^2$/g, from about 50 m$^2$/g to about 1100 m$^2$/g, from about 100 m$^2$/g to about 1100 m$^2$/g, from about 150 m$^2$/g to about 1100 m$^2$/g, from about 170 m$^2$/g to about 1100 m$^2$/g, from about 50 m$^2$/g to about 1000

$m^2/g$, from about 100 $m^2/g$ to about 1000 $m^2/g$, from about 150 $m^2/g$ to about 1000 $m^2/g$, from about 170 $m^2/g$ to about 1000 $m^2/g$, from about 100 $m^2/g$ to about 500 $m^2/g$, from about 100 $m^2/g$ to about 400 $m^2/g$, from about 100 $m^2/g$ to about 350 $m^2/g$, from about 100 $m^2/g$ to about 300 $m^2/g$, or from about 100 $m^2/g$ to about 250 $m^2/g$, from about 150 $m^2/g$ to about 500 $m^2/g$, from about 150 $m^2/g$ to about 400 $m^2/g$, from about 150 $m^2/g$ to about 350 $m^2/g$, from about 150 $m^2/g$ to about 300 $m^2/g$, or from about 150 $m^2/g$ to about 250 $m^2/g$. In some embodiments, the BET surface area ranges from about 70 $m^2/g$ to 150 $m^2/g$, from about 70 $m^2/g$ to 125 $m^2/g$, from about 70 $m^2/g$ to 100 $m^2/g$, from about 50 $m^2/g$ to 150 $m^2/g$, from about 50 $m^2/g$ to 125 $m^2/g$, from about 50 $m^2/g$ to 100 $m^2/g$, from about 50 $m^2/g$ to 80 $m^2/g$, from about 25 $m^2/g$ to 150 $m^2/g$, from about 25 $m^2/g$ to 125 $m^2/g$, from about 25 $m^2/g$ to 100 $m^2/g$, from about 25 $m^2/g$ to 70 $m^2/g$, from about 10 $m^2/g$ to 150 $m^2/g$, from about 10 $m^2/g$ to 125 $m^2/g$, from about 10 $m^2/g$ to 100 $m^2/g$, from about 10 $m^2/g$ to 70 $m^2/g$, from about 10 $m^2/g$ to 50 $m^2/g$, from about 5 $m^2/g$ to 150 $m^2/g$, from about 5 $m^2/g$ to 125 $m^2/g$, from about 5 $m^2/g$ to 100 $m^2/g$, from about 5 $m^2/g$ to 70 $m^2/g$, from about 5 $m^2/g$ to 50 $m^2/g$, from about 5 $m^2/g$ to 25 $m^2/g$, or from about 5 $m^2/g$ to 10 $m^2/g$.

In some embodiments, any of the above catalyst composition may optionally further consist essentially of one or more of an alkali metal, an alkaline earth metal, zinc, or iron.

Catalyst Device Embodiments

In some embodiments, the catalyst device may comprise a housing and a catalyst composition disposed in the housing, wherein the catalyst composition comprises manganese oxide, and wherein the catalyst composition comprises a BET surface area ranging from about 5 $m^2/g$ to about 2000 $m^2/g$, from about 10 $m^2/g$ to about 2000 $m^2/g$, from about 15 $m^2/g$ to about 2000 $m^2/g$, from about 20 $m^2/g$ to about 2000 $m^2/g$, from about 25 $m^2/g$ to about 2000 $m^2/g$, from about 30 $m^2/g$ to about 2000 $m^2/g$, from about 35 $m^2/g$ to about 2000 $m^2/g$, from about 40 $m^2/g$ to about 2000 $m^2/g$, from about 45 $m^2/g$ to about 2000 $m^2/g$, from about 5 $m^2/g$ to about 1500 $m^2/g$, from about 5 $m^2/g$ to about 1300 $m^2/g$, from about 5 $m^2/g$ to about 1100 $m^2/g$, from about 5 $m^2/g$ to about 1000 $m^2/g$, from about 5 $m^2/g$ to about 750 $m^2/g$, from about 5 $m^2/g$ to about 500 $m^2/g$, from about 5 $m^2/g$ to about 400 $m^2/g$, from about 5 $m^2/g$ to about 300 $m^2/g$, from about 5 $m^2/g$ to about 200 $m^2/g$, from about 5 $m^2/g$ to about 150 $m^2/g$, from about 5 $m^2/g$ to about 100 $m^2/g$, from about 5 $m^2/g$ to about 75 $m^2/g$, from about 5 $m^2/g$ to about 50 $m^2/g$, from about 5 $m^2/g$ to about 30 $m^2/g$, from about 50 $m^2/g$ to about 2000 $m^2/g$, from about 100 $m^2/g$ to about 2000 $m^2/g$, from about 150 $m^2/g$ to about 2000 $m^2/g$, from about 170 $m^2/g$ to about 2000 $m^2/g$, from about 50 $m^2/g$ to about 1500 $m^2/g$, from about 100 $m^2/g$ to about 1500 $m^2/g$, from about 150 $m^2/g$ to about 1500 $m^2/g$, from about 170 $m^2/g$ to about 1500 $m^2/g$, from about 50 $m^2/g$ to about 1300 $m^2/g$, from about 100 $m^2/g$ to about 1300 $m^2/g$, from about 150 $m^2/g$ to about 1300 $m^2/g$, from about 170 $m^2/g$ to about 1300 $m^2/g$, from about 50 $m^2/g$ to about 1100 $m^2/g$, from about 100 $m^2/g$ to about 1100 $m^2/g$, from about 150 $m^2/g$ to about 1100 $m^2/g$, from about 170 $m^2/g$ to about 1100 $m^2/g$, from about 50 $m^2/g$ to about 1000 $m^2/g$, from about 100 $m^2/g$ to about 1000 $m^2/g$, from about 150 $m^2/g$ to about 1000 $m^2/g$, from about 170 $m^2/g$ to about 1000 $m^2/g$, from about 100 $m^2/g$ to about 500 $m^2/g$, from about 100 $m^2/g$ to about 400 $m^2/g$, from about 100 $m^2/g$ to about 350 $m^2/g$, from about 100 $m^2/g$ to about 300 $m^2/g$, or from about 100 $m^2/g$ to about 250 $m^2/g$, from about 150 $m^2/g$ to about 500 $m^2/g$, from about 150 $m^2/g$ to about 400 $m^2/g$, from about 150 $m^2/g$ to about 350 $m^2/g$, from about 150 $m^2/g$ to about 300 $m^2/g$, or from about 150 $m^2/g$ to about 250 $m^2/g$. In some embodiments, the BET surface area ranges from about 70 $m^2/g$ to 150 $m^2/g$, from about 70 $m^2/g$ to 125 $m^2/g$, from about 70 $m^2/g$ to 100 $m^2/g$, from about 50 $m^2/g$ to 150 $m^2/g$, from about 50 $m^2/g$ to 125 $m^2/g$, from about 50 $m^2/g$ to 100 $m^2/g$, from about 50 $m^2/g$ to 80 $m^2/g$, from about 25 $m^2/g$ to 150 $m^2/g$, from about 25 $m^2/g$ to 125 $m^2/g$, from about 25 $m^2/g$ to 100 $m^2/g$, from about 25 $m^2/g$ to 70 $m^2/g$, from about 10 $m^2/g$ to 150 $m^2/g$, from about 10 $m^2/g$ to 125 $m^2/g$, from about 10 $m^2/g$ to 100 $m^2/g$, from about 10 $m^2/g$ to 70 $m^2/g$, from about 10 $m^2/g$ to 50 $m^2/g$, from about 5 $m^2/g$ to 150 $m^2/g$, from about 5 $m^2/g$ to 125 $m^2/g$, from about 5 $m^2/g$ to 100 $m^2/g$, from about 5 $m^2/g$ to 70 $m^2/g$, from about 5 $m^2/g$ to 50 $m^2/g$, from about 5 $m^2/g$ to 25 $m^2/g$, or from about 5 $m^2/g$ to 10 $m^2/g$. The catalyst composition disposed within the housing may be any of the catalyst compositions disclosed herein. For example, in some embodiments, the catalyst device may comprise a housing and a catalyst composition disposed in the housing, wherein the catalyst composition comprises manganese oxide, a binder, and activated carbon.

The catalyst device may further comprise an inlet port configured to receive unpurified air into an interior of the housing and an outlet port configured to deliver purified air from the housing. The catalyst device may be configured to contact the unpurified air with the catalyst composition disposed in the housing.

The catalyst composition, whether as a plurality of extruded particles or as part of a catalyst system in which the catalyst composition is coated onto the solid substrate, is arranged in the housing of the catalyst device, such that when an air flow is introduced into the air catalyst device, the catalyst particles or catalyst coating layer contacts the air flow and either removes formaldehyde or converts formaldehyde in the air flow into carbon dioxide and water. In certain embodiments, other pollutants and/or contaminants in the air flow may be removed or converted into harmless or less harmful chemical species upon contact with the catalyst particle(s) or catalyst layer(s).

In some embodiments, the present invention is directed to a catalyst device for purifying an air supply from contaminants such as formaldehyde, ozone, carbon monoxide, nitrogen oxides, amines, sulfur compounds, thiols, chlorinated hydrocarbons, or volatile organic compounds. The formaldehyde content in the unpurified air stream entering the catalyst device may range from about 1 ppb to about 50 ppm. The ozone content in the unpurified air stream entering the catalyst device may range from about 1 ppb to about 2 ppm. The volatile organic compounds content in the unpurified air stream entering the catalyst device may range from about 1 ppb to about 0.5 vol. %. The contaminants content in the unpurified air stream may also be referred herein as initial contaminant content, e.g., initial formaldehyde content, initial ozone content, initial volatile organic compound content, and so on.

In some embodiments, the contaminants present in the unpurified air stream (such as formaldehyde, ozone, carbon monoxide, nitrogen oxides, amines, sulfur compounds, thiols, chlorinated hydrocarbons, or volatile organic compounds) may be removed upon contact of the unpurified air stream with the catalyst composition disposed in the catalyst device. For example, the unpurified air stream may have an initial formaldehyde content, and the purified air stream exiting from the catalyst device may have a final formaldehyde content that is less than the initial formaldehyde content.

The final formaldehyde content of the purified air stream may be equal to about 50% or less, equal to about 40% or less, equal to about 30% or less, or equal to about 20% or less of the initial formaldehyde content in the unpurified air stream. The final ozone content of the purified air stream may be equal to about 50% or less, equal to about 40% or less, or equal to about 30% or less of the initial ozone content in the unpurified air stream. The final volatile organic compounds content of the purified air stream may be equal to about 90% or less, equal to about 80% or less, or equal to about 70% or less of the initial volatile organic compounds content in the unpurified air stream.

In some embodiments, the catalyst composition disposed within the housing may be in an extrudate form as described in the catalyst composition section above. In other embodiments, the catalyst composition present within the housing may be disposed on a solid substrate, thereby forming a catalyst system disposed in a housing of the catalyst device. The catalyst system is described in more detail in the catalyst composition section above.

In some embodiments, the catalyst device may be incorporated into a heating, ventilation, and air conditioning (HVAC) system. In some embodiments, the catalyst device may be a portable air purifier or an ionic air purifier. In some embodiments, the catalyst device may be incorporated into a vehicle selected from the group consisting of motor vehicles, railed vehicles, watercraft, aircraft, and spacecraft. For example, the catalyst device may be incorporated into a cabin of an automobile or an airplane. In some embodiments, the catalyst composition may remove gas phase contaminants from air streams in air purifiers which use various purification technologies, such as filtration, ionization, washing and the like. For example, in ionic air purifiers, where gaseous contaminants are removed by ionization (plasma), the catalyst composition may be used to remove ozone, or other pollutants generated within the air cleaner, as well as pollutants present in the air outside the device.

In some embodiments, the present invention is directed to a method for purifying an air flow stream. The method may comprise contacting an unpurified air flow stream with a catalyst composition to produce a purified air flow stream, wherein the unpurified air flow stream contains a first formaldehyde content (or an initial formaldehyde content), the purified air stream contains a second formaldehyde content (or a final formaldehyde content) that is less than the first formaldehyde content, wherein the catalyst composition comprises manganese oxide, and wherein the catalyst composition comprises a BET surface area ranging from about 5 $m^2/g$ to about 2000 $m^2/g$, from about 10 $m^2/g$ to about 2000 $m^2/g$, from about 15 $m^2/g$ to about 2000 $m^2/g$, from about 20 $m^2/g$ to about 2000 $m^2/g$, from about 25 $m^2/g$ to about 2000 $m^2/g$, from about 30 $m^2/g$ to about 2000 $m^2/g$, from about 35 $m^2/g$ to about 2000 $m^2/g$, from about 40 $m^2/g$ to about 2000 $m^2/g$, from about 45 $m^2/g$ to about 2000 $m^2/g$, from about 5 $m^2/g$ to about 1500 $m^2/g$, from about 5 $m^2/g$ to about 1300 $m^2/g$, from about 5 $m^2/g$ to about 1100 $m^2/g$, from about 5 $m^2/g$ to about 1000 $m^2/g$, from about 5 $m^2/g$ to about 750 $m^2/g$, from about 5 $m^2/g$ to about 500 $m^2/g$, from about 5 $m^2/g$ to about 400 $m^2/g$, from about 5 $m^2/g$ to about 300 $m^2/g$, from about 5 $m^2/g$ to about 200 $m^2/g$, from about 5 $m^2/g$ to about 150 $m^2/g$, from about 5 $m^2/g$ to about 100 $m^2/g$, from about 5 $m^2/g$ to about 75 $m^2/g$, from about 5 $m^2/g$ to about 50 $m^2/g$, from about 5 $m^2/g$ to about 30 $m^2/g$, from about 50 $m^2/g$ to about 2000 $m^2/g$, from about 100 $m^2/g$ to about 2000 $m^2/g$, from about 150 $m^2/g$ to about 2000 $m^2/g$, from about 170 $m^2/g$ to about 2000 $m^2/g$, from about 50 $m^2/g$ to about 1500 $m^2/g$, from about 100 $m^2/g$ to about 1500 $m^2/g$, from about 150 $m^2/g$ to about 1500 $m^2/g$, from about 170 $m^2/g$ to about 1500 $m^2/g$, from about 50 $m^2/g$ to about 1300 $m^2/g$, from about 100 $m^2/g$ to about 1300 $m^2/g$, from about 150 $m^2/g$ to about 1300 $m^2/g$, from about 170 $m^2/g$ to about 1300 $m^2/g$, from about 50 $m^2/g$ to about 1100 $m^2/g$, from about 100 $m^2/g$ to about 1100 $m^2/g$, from about 150 $m^2/g$ to about 1100 $m^2/g$, from about 170 $m^2/g$ to about 1100 $m^2/g$, from about 50 $m^2/g$ to about 1000 $m^2/g$, from about 100 $m^2/g$ to about 1000 $m^2/g$, from about 150 $m^2/g$ to about 1000 $m^2/g$, from about 170 $m^2/g$ to about 1000 $m^2/g$, from about 100 $m^2/g$ to about 500 $m^2/g$, from about 100 $m^2/g$ to about 400 $m^2/g$, from about 100 $m^2/g$ to about 350 $m^2/g$, from about 100 $m^2/g$ to about 300 $m^2/g$, or from about 100 $m^2/g$ to about 250 $m^2/g$, from about 150 $m^2/g$ to about 500 $m^2/g$, from about 150 $m^2/g$ to about 400 $m^2/g$, from about 150 $m^2/g$ to about 350 $m^2/g$, from about 150 $m^2/g$ to about 300 $m^2/g$, or from about 150 $m^2/g$ to about 250 $m^2/g$. In some embodiments, the BET surface area ranges from about 70 $m^2/g$ to 150 $m^2/g$, from about 70 $m^2/g$ to 125 $m^2/g$, from about 70 $m^2/g$ to 100 $m^2/g$, from about 50 $m^2/g$ to 150 $m^2/g$, from about 50 $m^2/g$ to 125 $m^2/g$, from about 50 $m^2/g$ to 100 $m^2/g$, from about 50 $m^2/g$ to 80 $m^2/g$, from about 25 $m^2/g$ to 150 $m^2/g$, from about 25 $m^2/g$ to 125 $m^2/g$, from about 25 $m^2/g$ to 100 $m^2/g$, from about 25 $m^2/g$ to 70 $m^2/g$, from about 10 $m^2/g$ to 150 $m^2/g$, from about 10 $m^2/g$ to 125 $m^2/g$, from about 10 $m^2/g$ to 100 $m^2/g$, from about 10 $m^2/g$ to 70 $m^2/g$, from about 10 $m^2/g$ to 50 $m^2/g$, from about 5 $m^2/g$ to 150 $m^2/g$, from about 5 $m^2/g$ to 125 $m^2/g$, from about 5 $m^2/g$ to 100 $m^2/g$, from about 5 $m^2/g$ to 70 $m^2/g$, from about 5 $m^2/g$ to 50 $m^2/g$, from about 5 $m^2/g$ to 25 $m^2/g$, or from about 5 $m^2/g$ to 10 $m^2/g$. It is to be understood that the method for purifying an air flow stream may be performed with any of the catalyst compositions disclosed herein.

In some embodiments, the method for purifying an air flow stream and the catalyst composition utilized therein may produce a purified air stream at a first efficiency when first contacted with the unpurified air flow stream and may produce a purified air stream at a second efficiency after contacting the unpurified air flow stream for a certain duration, for example for three hours. In some embodiments, the second efficiency may be reduced by about 20% or less, or by about 10% or less as compared to the first efficiency.

In some embodiments, the contacting of the unpurified air stream with the catalyst composition may occur at a temperature ranging from about 10° C. to about 150° C., from about 15° C. to about 80° C., from about 10° C. to about 50° C., or from about 20° C. to about 40° C., at about 21° C., at about 25° C., or at about 35° C.; at a relative humidity ranging from about 10% to about 90%; and at a space velocity ranging from about 100 $h^{-1}$ to about 1,000,000 $h^{-1}$.

Extruded Catalyst Composition Preparation

Figure 2:
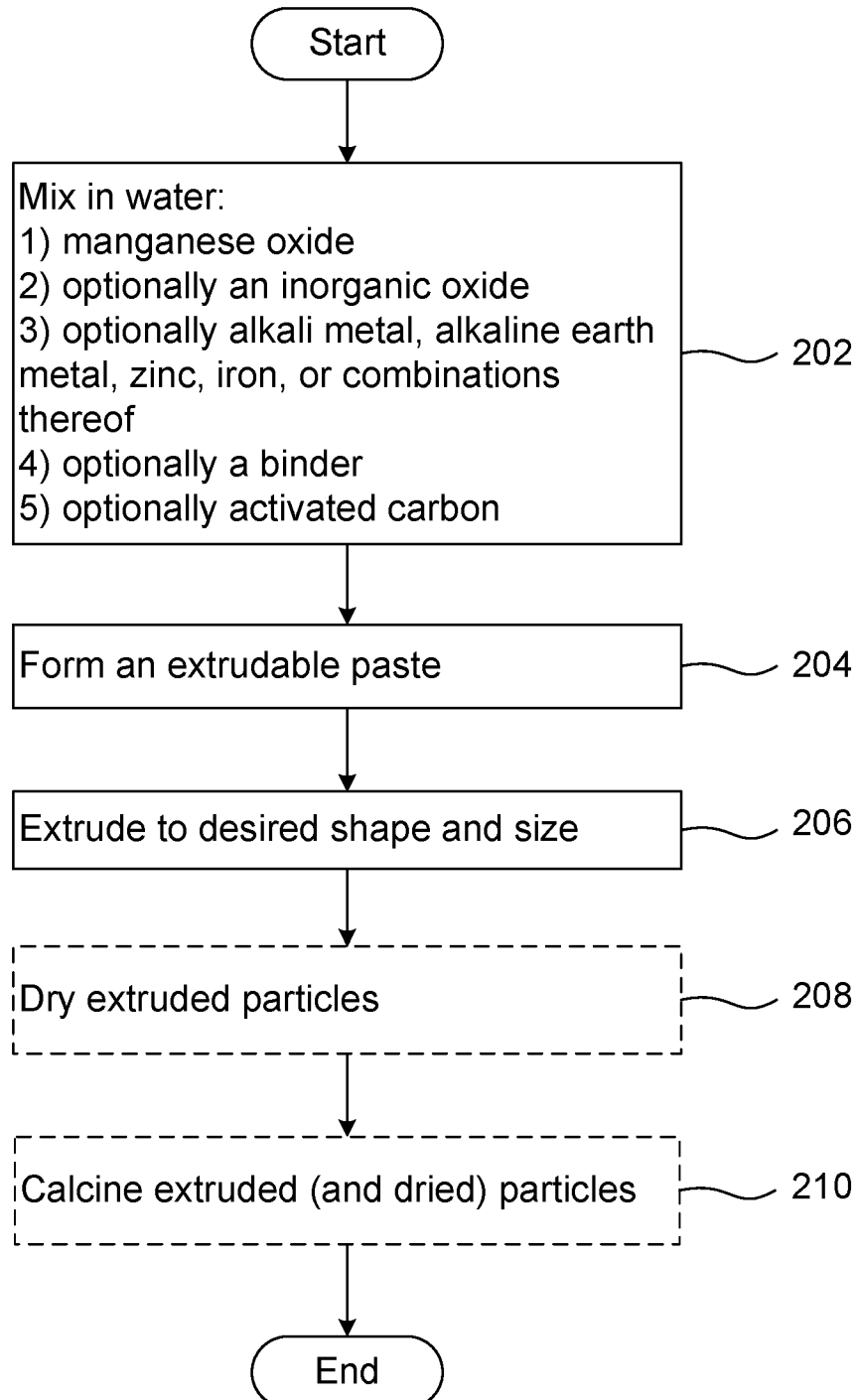
FIG. 2 depicts an illustrative process for producing a catalyst composition in accordance with an embodiment.

In some embodiments, the present invention is directed to a method for preparing an extruded catalyst composition in accordance with process 200 illustrated in FIG. 2. The method may comprise mixing manganese oxide in water to form an extrudable paste. In some embodiments, the method may comprise forming an extrudable paste by mixing in water manganese oxide and optionally one or more of an alkali metal, an alkaline earth metal, zinc, iron, or combinations thereof, an inorganic oxide, a binder, and/or activated carbon, pursuant to blocks 202 and 204. Additives such as pore builders and extrusion aids may further be added to the paste. The order in which the components are presented in block 202 is not to be construed as limiting and it is to be understood that unless otherwise noted, the components may be added at any order. The method may further comprise, pursuant to block 206, extruding the paste to form an extruded catalyst composition of a desired shape and size.

In some embodiments, the method may further optionally comprise drying the extruded catalyst composition particle(s), pursuant to block 208. The drying may occur at a temperature ranging from about 60° C. to about 350° C., from about 80° C. to about 150° C., or at about 90° C. The drying may occur for a duration ranging from about 1 hour to about 24 hours, from about 2 hours to about 12 hours, or for about 4 hours. In some embodiments, the method may further optionally comprise calcining the extruded catalyst composition particle(s), pursuant to block 210. The calcining may occur at a temperature ranging from about 90° C. to about 1200° C., from about 100° C. to about 500° C., from about 100° C. to about 300° C., or at about 250° C. The calcining is optional and may occur for a duration of up to about 4 hours, from about 1.5 hours to about 3 hours, or for about 2 hours.

It should be understood that the above steps of the flow diagrams of FIG. 2 may be executed or performed in any order or sequence not limited to the order and sequence shown and described. Also, some of the steps in FIG. 2 may be executed or performed substantially simultaneously, where appropriate.

The final extruded catalyst composition may be porous and may have pore volumes ranging from about 0.3 mL/g to about 1.5 mL/g, from about 0.3 mL/g to about 1 mL/g, from about 0.3 mL/g to about 0.9 mL/g, from about 0.5 mL/g to about 0.9 mL/g, or from about 0.5 mL/g to about 0.75 mL/g. The final extruded catalyst composition may have a BET surface area ranging from about 10 $m^2/g$ to about 2000 $m^2/g$, from about 15 $m^2/g$ to about 2000 $m^2/g$, from about 15 $m^2/g$ to about 1500 $m^2/g$, from about 15 $m^2/g$ to about 1300 $m^2/g$, from about 15 $m^2/g$ to about 1100 $m^2/g$, from about 15 $m^2/g$ to about 1000 $m^2/g$, from about 15 $m^2/g$ to about 750 $m^2/g$, from about 15 $m^2/g$ to about 500 $m^2/g$, from about 15 $m^2/g$ to about 400 $m^2/g$, from about 15 $m^2/g$ to about 300 $m^2/g$, from about 15 $m^2/g$ to about 200 $m^2/g$, from about 15 $m^2/g$ to about 150 $m^2/g$, from about 15 $m^2/g$ to about 100 $m^2/g$, from about 15 $m^2/g$ to about 75 $m^2/g$, from about 15 $m^2/g$ to about 50 $m^2/g$, from about 15 $m^2/g$ to about 30 $m^2/g$, from about 150 $m^2/g$ to about 2000 $m^2/g$, from about 170 $m^2/g$ to about 2000 $m^2/g$, from about 150 $m^2/g$ to about 1500 $m^2/g$, from about 170 $m^2/g$ to about 1500 $m^2/g$, from about 150 $m^2/g$ to about 1300 $m^2/g$, from about 170 $m^2/g$ to about 1300 $m^2/g$, from about 150 $m^2/g$ to about 1100 $m^2/g$, from about 170 $m^2/g$ to about 1100 $m^2/g$, from about 150 $m^2/g$ to about 1000 $m^2/g$, from about 170 $m^2/g$ to about 1000 $m^2/g$, from about 150 $m^2/g$ to about 500 $m^2/g$, from about 170 $m^2/g$ to about 400 $m^2/g$, from about 150 $m^2/g$ to about 350 $m^2/g$, from about 175 $m^2/g$ to about 300 $m^2/g$, or from about 200 $m^2/g$ to about 250 $m^2/g$. In some embodiments, the BET surface area is from about 70 $m^2/g$ to 150 $m^2/g$. In some embodiments, the resulting extruded catalyst composition is configured to remove formaldehyde at a first efficiency when first introduced to an unpurified air flow stream and at a second efficiency after contacting the unpurified air stream for a period of time, such as three hours. In some embodiments, the second efficiency is reduced by about 20% or less or by about 10% or less as compared to the first efficiency.

In some embodiments, the order of addition of the various components to the mixture with water to form the extrudable paste is inconsequential. In other embodiments, the one or more of alkali metal, alkaline earth metal, zinc, iron, or combinations thereof may be added last to the extrudable paste to achieve improved contaminants conversion efficiency. Improved contaminants conversion efficiency may be determined based on the first efficiency illustrating how effectively contaminants are converted or removed from the unpurified air stream during the initial contact between the unpurified air stream and the catalyst composition. Improved contaminants conversion efficiency is also evident when the difference between the first and the second conversion efficiencies is minimal.

Coating Layer Catalyst Composition Preparation

Figure 3:
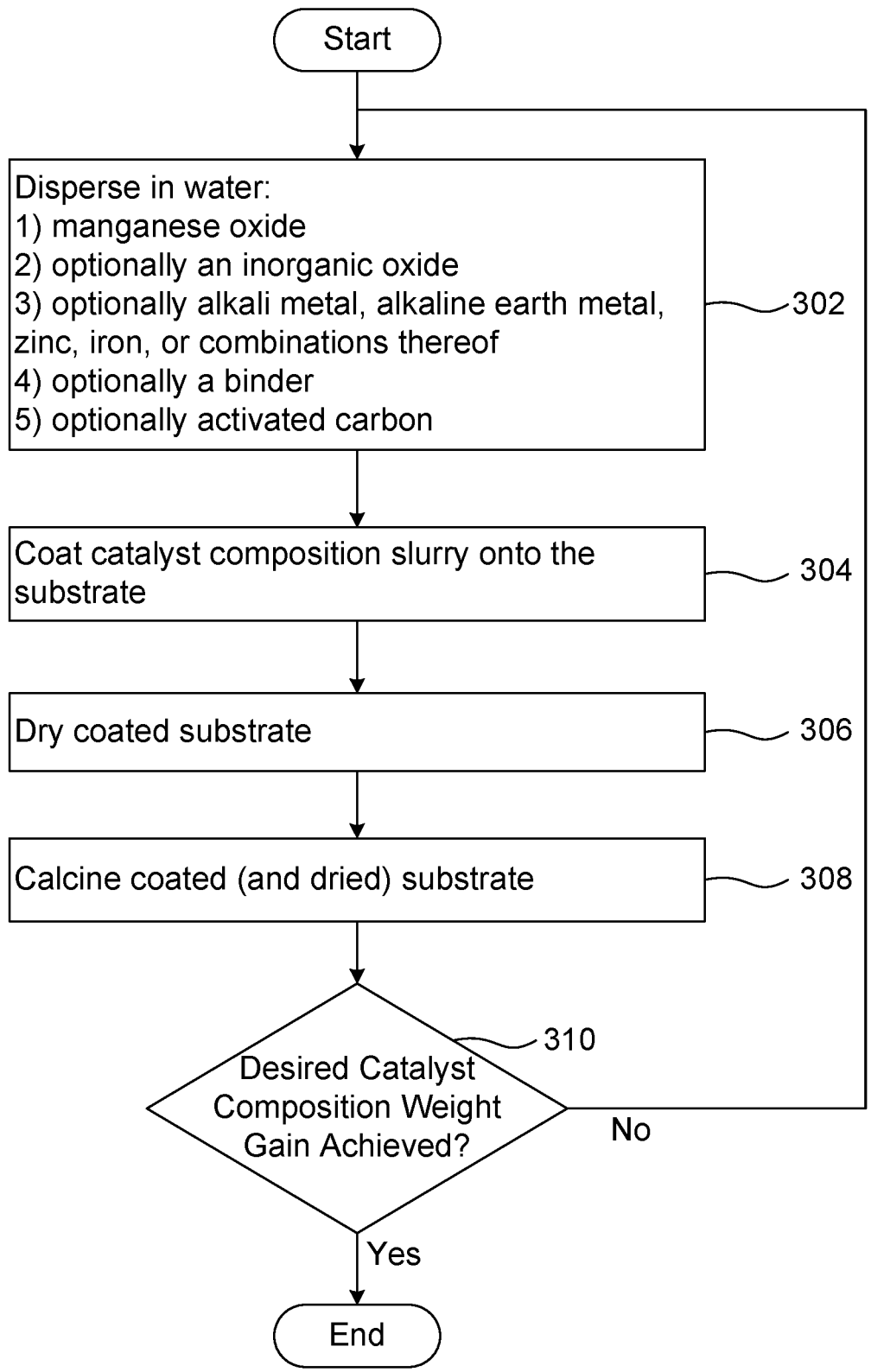
FIG. 3 depicts an illustrative process for producing a catalyst composition in accordance with an embodiment.

In some embodiments, the invention is directed to a method for preparing a catalyst composition disposed onto a substrate as a coating layer or as a plurality of coating layers. The method 300 is illustrated in FIG. 3. In some embodiments, the method may comprise dispersing in water manganese oxide and optionally one or more of an alkali metal, an alkaline earth metal, zinc, iron, or combinations thereof, an inorganic oxide, a binder, and/or activated carbon, pursuant to block 302. In some embodiments, the method may comprise adding a pH adjusting agent such as acetic acid or a cellulose based thickener. In some embodiments, the method may further comprise adding a dispersant such as Dispex N40V, Solsphere 2700, Carbosphere and the like. In some embodiments, the method may further comprise coating the catalyst composition slurry onto a substrate, pursuant to block 304. The slurry may be, for example, sprayed onto the solid substrate, dip-coated onto the solid substrate, or directly deposited onto the solid substrate.

In some embodiments, the method may optionally further comprise drying the coated substrate, pursuant to block 306. The drying may occur at a temperature ranging from about 60° C. to about 150° C., from about 80° C. to about 130° C., or at about 90° C. The drying may occur for a duration ranging from about 2 minutes to about 8 hours, from about 1 hour to about 8 hours, from about 2 hours to about 6 hours, or for about 2 hours. In some embodiments, the method may optionally further comprise calcining the extruded catalyst composition particle(s), pursuant to block 308. The calcining may occur at a temperature ranging from about 70° C. to about 1200° C., from about 80° C. to about 800° C., from about 100° C. to about 600° C., from about 120° C. to about 300° C., or at about 250° C. The calcining is optional and may occur for a duration of up to about 4 hours, from about 0.5 hours to about 3 hours, or for about 1 hour.

The catalyst composition may be coated onto the substrate repeatedly until a desired weight gain is achieved. In some embodiments, the desired weight gain may range from about 0.5 $g/in^3$ to about 10 $g/in^3$, from about 0.5 $g/in^3$ to about 5 $g/in^3$, from about 0.5 $g/in^3$ to about 4 $g/in^3$, about 1 $g/in^3$, or about 2 $g/in^3$.

It should be understood that the steps in FIG. 3 may be executed or performed in any order or sequence not limited to the order and sequence shown and described. Also, some of the steps in FIG. 3 may be executed or performed substantially simultaneously, where appropriate.

The final catalyst system comprising a catalyst composition layer deposited onto a substrate may be porous and may have pore volumes ranging from about 0.3 mL/g to about 1.5 mL/g, from about 0.3 mL/g to about 1 mL/g, from about 0.3 mL/g to about 0.9 mL/g, from about 0.5 mL/g to about 0.9 mL/g, or from about 0.5 mL/g to about 0.75 mL/g. The final catalyst system comprising a catalyst composition layer deposited onto a substrate may have a BET surface area ranging from about 5 m²/g to about 2000 m²/g, from about 10 m²/g to about 2000 m²/g, from about 15 m²/g to about 2000 m²/g, from about 20 m²/g to about 2000 m²/g, from about 25 m²/g to about 2000 m²/g, from about 30 m²/g to about 2000 m²/g, from about 35 m²/g to about 2000 m²/g, from about 40 m²/g to about 2000 m²/g, from about 45 m²/g to about 2000 m²/g, from about 5 m²/g to about 1500 m²/g, from about 5 m²/g to about 1300 m²/g, from about 5 m²/g to about 1100 m²/g, from about 5 m²/g to about 1000 m²/g, from about 5 m²/g to about 750 m²/g, from about 5 m²/g to about 500 m²/g, from about 5 m²/g to about 400 m²/g, from about 5 m²/g to about 300 m²/g, from about 5 m²/g to about 200 m²/g, from about 5 m²/g to about 150 m²/g, from about 5 m²/g to about 100 m²/g, from about 5 m²/g to about 75 m²/g, from about 5 m²/g to about 50 m²/g, from about 5 m²/g to about 30 m²/g, from about 50 m²/g to about 2000 m²/g, from about 100 m²/g to about 2000 m²/g, from about 150 m²/g to about 2000 m²/g, from about 170 m²/g to about 2000 m²/g, from about 50 m²/g to about 1500 m²/g, from about 100 m²/g to about 1500 m²/g, from about 150 m²/g to about 1500 m²/g, from about 170 m²/g to about 1500 m²/g, from about 50 m²/g to about 1300 m²/g, from about 100 m²/g to about 1300 m²/g, from about 150 m²/g to about 1300 m²/g, from about 170 m²/g to about 1300 m²/g, from about 50 m²/g to about 1100 m²/g, from about 100 m²/g to about 1100 m²/g, from about 150 m²/g to about 1100 m²/g, from about 170 m²/g to about 1100 m²/g, from about 50 m²/g to about 1000 m²/g, from about 100 m²/g to about 1000 m²/g, from about 150 m²/g to about 1000 m²/g, from about 170 m²/g to about 1000 m²/g, from about 100 m²/g to about 500 m²/g, from about 100 m²/g to about 400 m²/g, from about 100 m²/g to about 350 m²/g, from about 100 m²/g to about 300 m²/g, or from about 100 m²/g to about 250 m²/g, from about 150 m²/g to about 500 m²/g, from about 150 m²/g to about 400 m²/g, from about 150 m²/g to about 350 m²/g, from about 150 m²/g to about 300 m²/g, or from about 150 m²/g to about 250 m²/g. In some embodiments, the BET surface area ranges from about 70 m²/g to 150 m²/g, from about 70 m²/g to 125 m²/g, from about 70 m²/g to 100 m²/g, from about 50 m²/g to 150 m²/g, from about 50 m²/g to 125 m²/g, from about 50 m²/g to 100 m²/g, from about 50 m²/g to 80 m²/g, from about 25 m²/g to 150 m²/g, from about 25 m²/g to 125 m²/g, from about 25 m²/g to 100 m²/g, from about 25 m²/g to 70 m²/g, from about 10 m²/g to 150 m²/g, from about 10 m²/g to 125 m²/g, from about 10 m²/g to 100 m²/g, from about 10 m²/g to 70 m²/g, from about 10 m²/g to 50 m²/g, from about 5 m²/g to 150 m²/g, from about 5 m²/g to 125 m²/g, from about 5 m²/g to 100 m²/g, from about 5 m²/g to 70 m²/g, from about 5 m²/g to 50 m²/g, from about 5 m²/g to 25 m²/g, or from about 5 m²/g to 10 m²/g.

Figure 4:
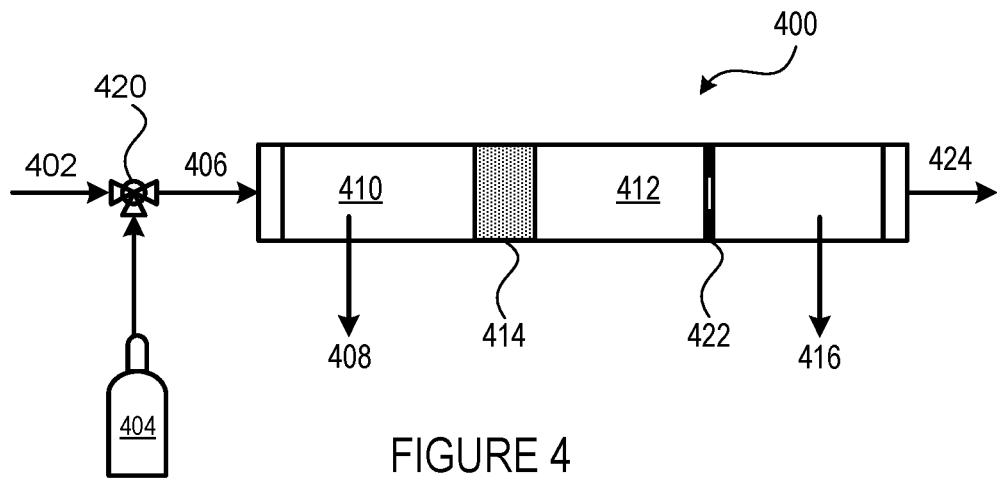
FIG. 4 depicts a one pass test schematic diagram for air purification in accordance with an embodiment.
Figure 5:
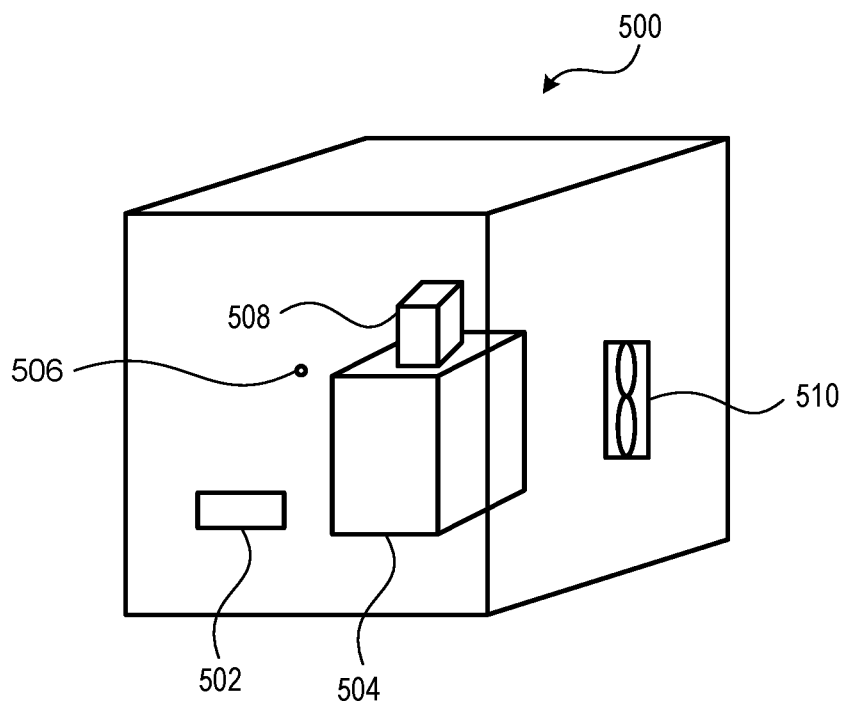
FIG. 5 depicts a system test schematic diagram for air purification in accordance with an embodiment.
Figure 6:
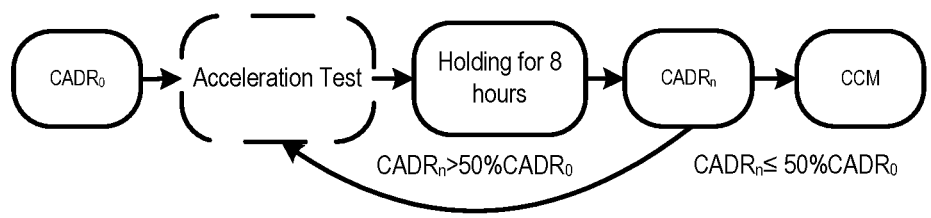
FIG. 6 depicts an illustrative control process for air purification in accordance with an embodiment disclosed herein.

FIGS. 4, 5 and 6 described in detail below are depictions of the one-pass test and system test set by the National Standards of the People's Republic of China and jointly issued by the General Administration of Quality Supervision, Inspection and Quarantine and the Standardization Administration of the People's Republic of China, also referred to as GB/T 18801 guidelines.

FIG. 4 depicts a schematic diagram for air purification in accordance with an embodiment. This schematic diagram illustrates a one-pass test set up configured to allow for quick sample screening and accelerated testing of the catalyst composition's efficacy.

The testing device comprises an air duct system 400, a pollutant generator 404, a mixing valve 420, an upstream sampling tube 408, a downstream sampling tube 416, and an air cleaner 414. In the one-pass test ambient air 402 enters mixing valve 420 where it is mixed with pollutants (such as formaldehyde and VOCs) generated in pollutant generator 404. Resulting polluted air 406 exits mixing valve 420 and enters air duct system 400 where the efficacy of air cleaner 414 is tested.

Air duct system 400 may be bent or folded. In some embodiments, if air duct system 400 is bent, a straight duct segment of at least three times the duct diameter is laid before and after the bend to ensure stable air flow. A sample of polluted air 406 entering first air duct segment 410 of the air duct may be sampled through upstream sampling tube 408 to determine the starting pollutant concentration in the unpurified air stream. Sampling tube 408 may comprise stainless steel or Teflon, and have smooth inner walls.

After passing first air duct segment 410, unpurified polluted air 406 contacts air cleaner 414. Air cleaner 414 includes a catalyst composition, either present as extruded catalyst particle(s) or as a catalyst layer(s) disposed on a substrate, wherein the catalyst composition may be any of the catalyst compositions disclosed herein.

Once unpurified polluted air 406 contacts air cleaner 414, purified air enters the second air duct segment 412. Second air duct segment may optionally include an air volume measuring device 422. Air volume measuring device 422 may include a standard orifice plate, a standard nozzle and other throttling devices connected to a micromanometer. The resulting pollutant concentration in purified air flow present in the second air duct segment 412 may be tested through downstream sampling tube 416. Sampling tube 416 may comprise stainless steel or Teflon, and have smooth inner walls. Resulting purified air 424 exits air duct system 400 and is collected for formaldehyde conversion testing and/or any other contaminants or pollutants conversion testing.

FIG. 5 depicts a schematic diagram for air purification in accordance with an embodiment of the invention. This schematic illustrates a system test set up configured according to national standard and critical for product performance evaluation.

The system test set up comprises a test chamber 500, a central platform 504, a catalyst device 508 to be tested, unpurified air inlet 506, fan 510 to allow for air circulation, and a unit 502 controlling temperature and humidity.

Unpurified air flow enters chamber 500 through unpurified air inlet 506. The unpurified air stream is drawn into air eddy formed by air circulation resulting from the operation of fan 510. Once the initial pollutant concentration in chamber 500 reaches a predetermined initial value, unpurified air inlet 506 is closed. Fan 510 may continue to operate for a period of time to ensure even distribution of the pollutant in chamber 500. Once even distribution of the pollutant is achieved, fan 510 is turned off. The point at which the fan is turned off is t=0 and the concentration is recorded as $C_0$. For example, the targeted initial concentration of formaldehyde may be about 1.00±0.2 mg/m³. Immediately thereafter the testing begins. Samples are collected every five minutes for a period of an hour to evaluate the cleaning capacity of the catalyst device in terms of Clean Air Delivery Rate (CADR) for gaseous pollutants such as formaldehyde.

The CADR is calculated based on Formula I:

$$CADR = 60 \cdot (k_e - k_n) \cdot V \qquad \text{Formula I}$$

wherein $k_e$ represents the total decay constant, $k_n$ represents natural decay constant, V represents the test chamber volume in m³, and ($k_e-k_n$) is calculated based on Formula II:

$$(k_e - k_n) \cdot t = -\ln(C_t/C_0) \qquad \text{Formula II}$$

wherein t represent the total testing time, $C_t$ represents the concentration at time t in mg/m$^3$, and $C_0$ represents the concentration at time t=0 in mg/m$^3$.

FIG. 6 depicts an illustrative control process for air purification in accordance with an embodiment of the invention. The control process may be applied to a similar system test chamber as illustrated in the schematic of FIG. 5. The method described by this control process is used to test the half life time of a catalyst device according to an embodiment of the invention. "Half life time of a catalyst device" refers to the number of days or hours after which the catalyst device has a CADR that is 50% lower than the initial CADR value produced by the catalyst device at the start of the catalyst device's operation.

According to FIG. 6 the testing begins by obtaining the CADR value produced by the catalyst device at the start of the catalyst device's operation (t=0), also known as $CADR_0$. Subsequently, the catalyst device is optionally subjected to an Acceleration Test. An "Acceleration Test" refers to extreme condition that may impact or deteriorate the efficacy of the catalyst device more rapidly, such as higher pollutant concentration or continuous generation of pollutants. The Acceleration Test results will then allow to estimate the catalyst device's life span under real life conditions.

After the catalyst device is aged for eight hours another sample is taken to obtain the CADR value at t=n, also known as $CADR_n$. If $CADR_n$ value is greater than 50 percent of the $CADR_0$ value, the catalyst device is considered as still operable and the testing continues by repeating the optional acceleration test, aging the catalyst device, and measuring the $CADR_n$ value after each subsequent cycle. Once the $CADR_n$ value is lower or equal to 50 percent of the $CADR_0$ value, the life span of the catalyst device is deemed to have ended and the overall Cumulate Clean Mass (CCM) generated by the catalyst device is calculated.

In some embodiments, any of the catalyst compositions described herein may be incorporated into polytetrafluoroethylene (PTFE) sheets (e.g., fibrillated PTFE sheets), for example, as cross-flow filters for formaldehyde/VOC removal. Such embodiments may be incorporated into a building HVAC system, an indoor air purifier, a filter for a gas mask, an air filter or off-gas treatment for an industrial plant, a pollutant removal system for drinking water, an odor removal system for cabin air (e.g., for automobiles or aircraft) or building ventilation, a humidity control system, a clean room air filtration system, or systems for environmental pollutant removal. In some embodiments, prior to incorporation into a PTFE sheet, the catalyst composition or adsorbent powder thereof may be processed into a three dimensional structure characterized by low pressure drop (due to defined flow channels), high accessibility of active sites (due to the use of a porous fibrillating binder), and high volumetric capacity (due to low binder content and a lack of inert support structure.

ILLUSTRATIVE EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein.

Example 1: Extrudate Preparation 1

70 grams (g) of manganese oxide polymorph I powder and 30 g of Versal 250 and water were thoroughly hand mixed to form an extrudable paste. 1/16" extrudates were pressed using a Carver press containing a 1.6 mm hole at the bottom. The solids were dried at 90° C. for 2 hours and calcined for 2 hours at 250° C.

Example 2: Extrudate Preparation 2

42 g of manganese oxide polymorph I powder, 42 g of Ceria powder, 16 g of Versal 250 and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 3: Extrudate Preparation 3

39 g of manganese oxide polymorph I powder, 39 g of Ceria powder, 7 g of sodium nitrate, 16 g of Versal 250 and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 4: Extrudate Preparation 4

50 g of manganese oxide polymorph I powder and 50 g of Versal 250 and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 5: Extrudate Preparation 50% Manganese Oxide Polymorph I/50% Sipernat Silica 50 g of manganese oxide polymorph I powder and 50 g of SipernatSilica and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 6: Extrudate Preparation 50% Manganese Oxide Polymorph I/50% Bentonite 50 g of manganese oxide polymorph I powder and 50 g of Bentonite and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 7: Extrudate Preparation 50% Manganese Oxide Polymorph I/50% VersalB 50 g of manganese oxide polymorph I powder and 50 g of Versal B and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 8: Extrudate Preparation 50% Manganese Oxide Polymorph I/50% $ZrO_2$ 50 g of manganese oxide polymorph I powder and 50 g of zirconia and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 9: Extrudate Preparation 50% Manganese Oxide Polymorph I/15% $CeO_2$/5% Bentonite/2% Na/1%9 Cellulose/27% Versal V-250

80.1 g of manganese oxide polymorph I powder, 23 g of ceria powder, 10.9 g of sodium bicarbonate, 42.8 g of Versal V-250, 8.3 g bentonite (approximate composition: 61 wt % $SiO_2$, 21 wt % $Al_2O_3$, 5 wt % $Fe_2O_3$, 4.6 wt % CaO, 4 wt % MgO based on total Bentonite weight), 2.3 g carbonyl cellulose and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 10: Extrudate Preparation 35% Manganese Oxide Polymorph I/35% $CeO_2$/30% Versal V-250

35 g of manganese oxide polymorph I powder, 35 g of ceria powder, 30 g of Versal V-250 and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 11: Extrudate Preparation 50% Poorly Crystalline Cryptomelane/50% Versal V-250

50 g of poorly crystalline cryptomelane powder and 50 g of Versal V-250 and water were thoroughly hand mixed to form an extrudable paste. 1/16" extrudates were pressed using a Carver press containing a 1.6 mm hole at the bottom. The solid were dried at 90° C. for 2 hours and calcined for 2 hours at 250° C.

Example 12: 50% Extrudates from Example 9/50% Activated Carbon 10 mL of Example 9 extrudates were physically mixed with 10 mL of activated carbon.

Example 13: 75% Extrudates from Example 9/25% Activated Carbon 15 mL of Example 9 extrudates were physically mixed with 5 mL of activated carbon.

Figure 7:
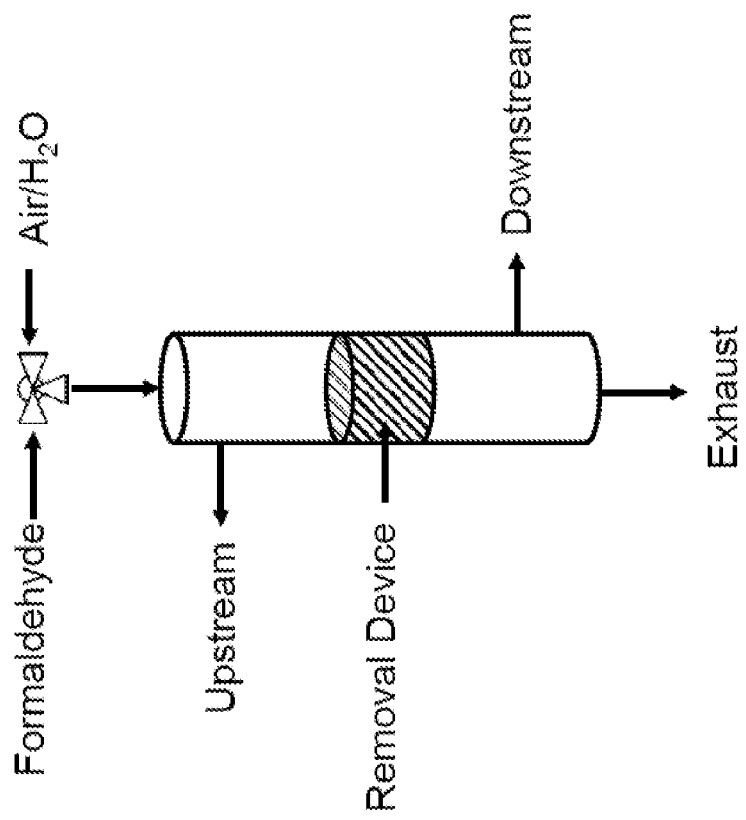
FIG. 7 depicts an illustrative test apparatus in accordance with an embodiment disclosed herein.
Figure 8:
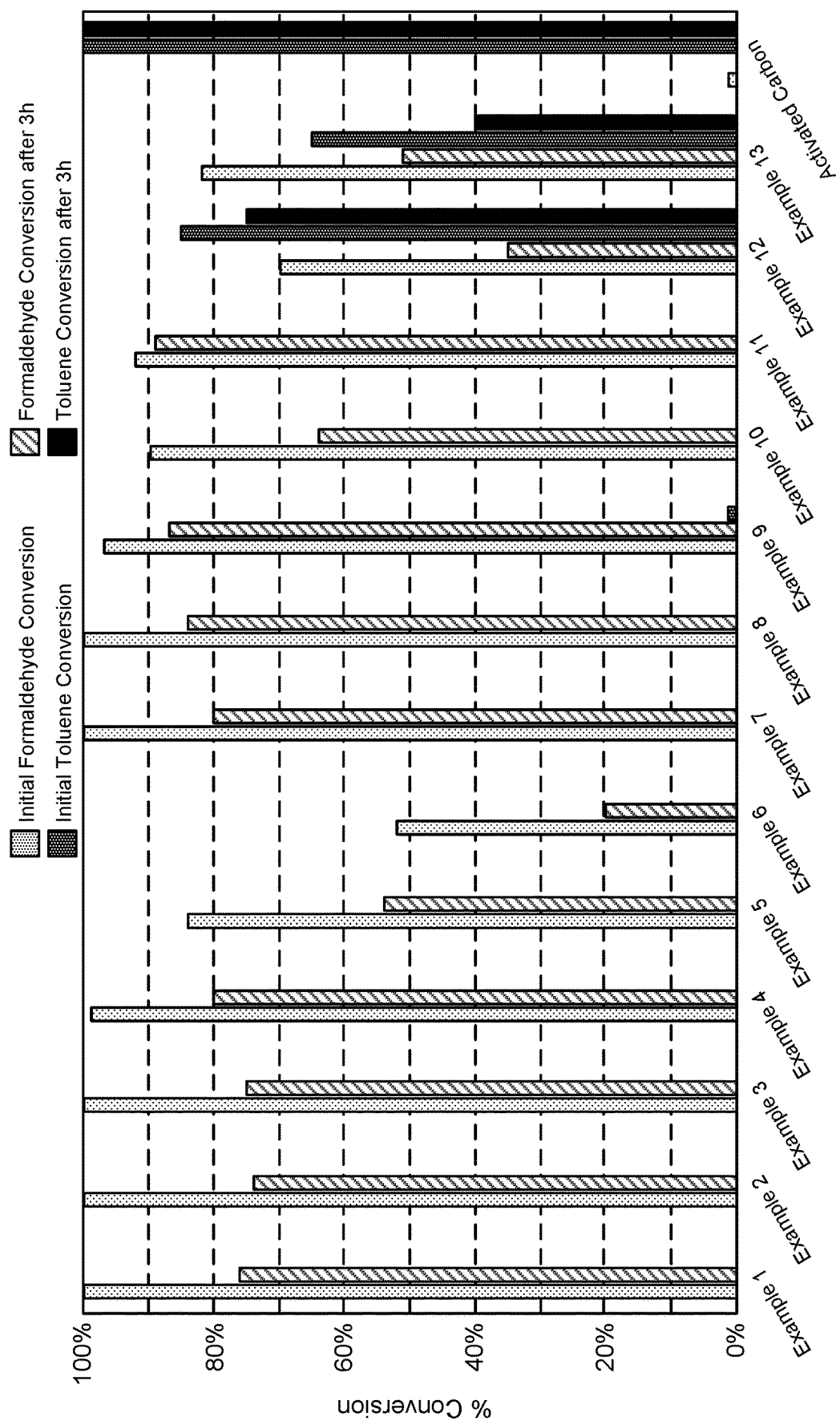
FIG. 8 is a plot depicting formaldehyde and toluene conversion for various catalyst compositions described in examples 1-13.

A packed bed column was used to evaluate the performance of the Examples, and is illustrated in FIG. 7. Results for the catalyst compositions prepared according to examples 1-13 after three hours of operation in the reactor are shown in FIG. 8. The packed bed was 1.5" (diameter)× 0.69" (height). The operation conditions were: an unpurified air flow stream (16.9 l/min) having about 2 ppm formaldehyde, 20% relative humidity in air at 30° C. was directed through the catalyst bed. For examples 9, 12, 13 and activated carbon, 20 ppm toluene was added to the unpurified air flow. The conversion values depicted in FIG. 8 are initial and after 3 hours.

Example 14: Cryptomelane 73.4 g of ceria and 73.4 g of cryptomelane manganese oxide were dispersed in 191 g of water, and a solution of 4.8 g alumina sol and 4.8 g acetic acid in 16.8 g water was added to the resulting slurry. A solution of cellulose base thickener (0.2 g) was added to the slurry with vigorous mixing. This slurry was used to coat ceramic monolithic substrates (cordierite; 400 cells per square inch). Afterwards the coated monolith was dried at 120° C. for 2 hours and calcined at 250° C. for 1 hour. The coating was repeated until the weight gain of the monolithic substrate was 1 g/in$^3$.

Example 15: Manganese Oxide Polymorph I 73.4 g of ceria and 73.4 g of manganese oxide polymorph I were dispersed in 191 g of water, and a solution of 4.8 g alumina sol and 4.8 g acetic acid in 16.8 g water was added to the resulting slurry. A solution of cellulose base thickener (0.2 g) was added to the slurry with vigorous mixing. This slurry was used to coat ceramic monolithic substrates (cordierite; 400 cells per square inch). Afterwards the coated monolith was dried at 120° C. for 2 hours and calcined at 250° C. for 1 hour. The coating was repeated until the weight gain of the monolithic substrate was 1 g/in$^3$ or 2 g/in$^3$. The resulting surface area of the catalyst composition was 157 m$^2$/g.

Example 16: Poorly Crystalline Cryptomelane 73.4 g of ceria and 73.4 g of poorly crystalline cryptomelane were dispersed in 191 g of water, and a solution of 4.8 g alumina sol and 4.8 g acetic acid in 16.8 g water was added to the resulting slurry. A solution of cellulose base thickener (0.2 g) was added to the slurry with vigorous mixing. This slurry was used to coat ceramic monolithic substrates (cordierite; 400 cells per square inch). Afterwards the coated monolith was dried at 120° C. for 2 hours and calcined at 250° C. for 1 hour. The coating was repeated until the weight gain of the monolithic substrate was 1 g/in$^3$. The resulting surface area of the calcined catalyst composition was 166 m$^2$/g.

Figure 9:
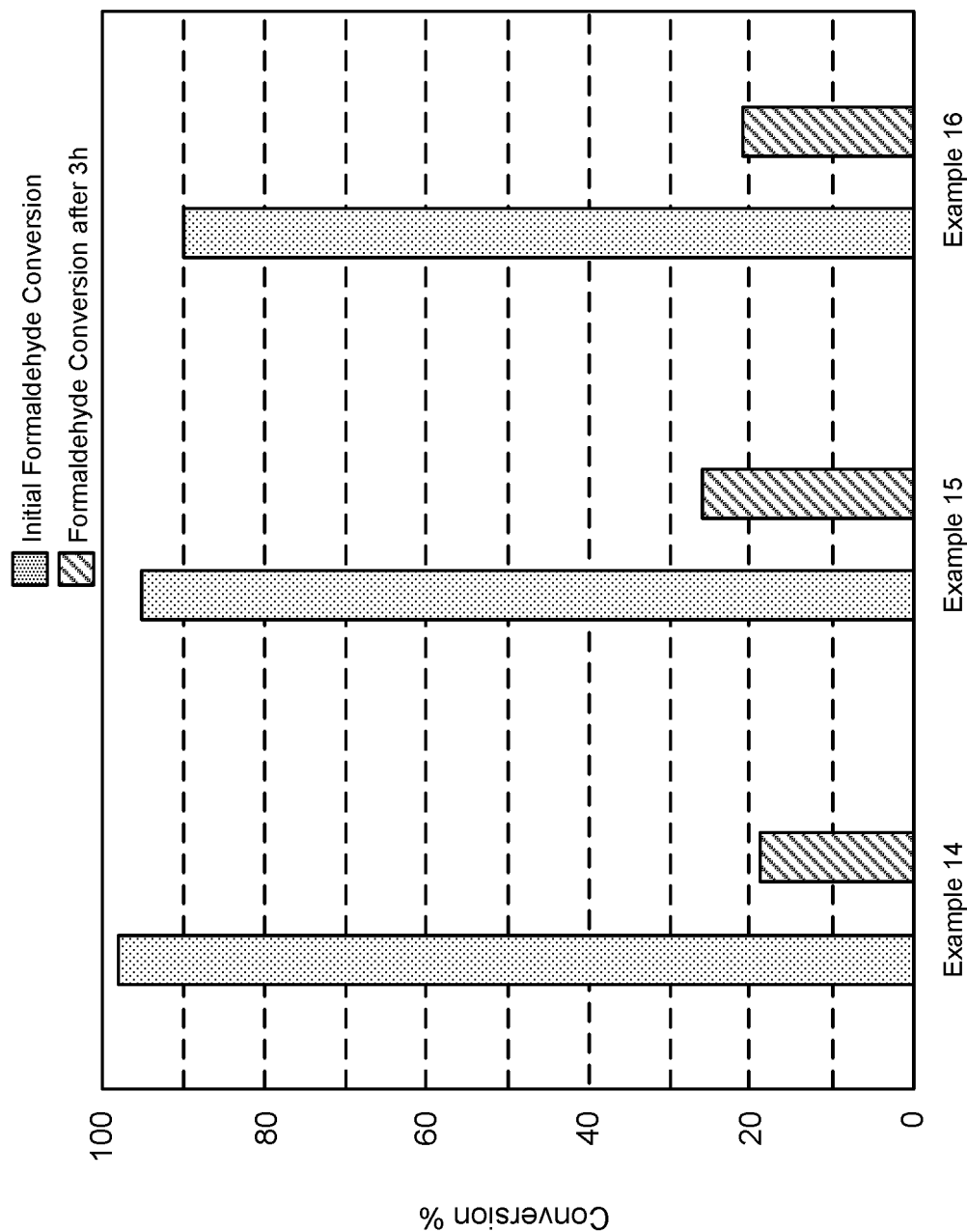
FIG. 9 is a plot depicting formaldehyde conversion for various catalyst compositions described in examples 14-16.

FIG. 9 shows a formaldehyde conversion comparison of catalyst compositions prepared according to examples 14-16. The coated cordierite (400 cpsi) was 1.7" (height) and 1" (diameter) coated with 1 g/in$^3$ catalyst. The operation conditions were: an unpurified air flow stream (36.5 L/min) having about 2 ppm formaldehyde, 20% relative humidity in air at 30° C. was directed over the catalyst. The conversion values depicted in FIG. 9 are initial and after 3 hours.

Example 17: 80% Manganese Oxide Polymorph I/20% Activated Carbon 18.5 g activated carbon and 49.7 g manganese oxide polymorph I were dispersed in 165.7 g of water, and a solution of 2.09 g alumina sol and 1.2 g acetic acid in 10 g water was added to the resulting slurry. 3.5 g of sodium carbonate was added to the slurry while stirring. This slurry was used to coat aluminum substrates (250 cells per square inch), 0.69" (height) and 1.5" (diameter) coated to 1 g/in³ catalyst. The operation conditions were: an unpurified air flow stream (38 L/min) having about 2 ppm formaldehyde, 20 ppm toluene, 20% relative humidity in air at 30° C. The initial formaldehyde conversion was 80%, and 17% after 3 hours. The toluene absorption was 45% initially, and 2% after 3 hours.

Example 18

40 g of ceria and 172 g of manganese oxide polymorph I were dispersed in 203 g of water, and a solution of 10 g alumina sol and 2 g acetic acid in 30 g water was added to the resulting slurry. 0.4 g of a dispersant as added. This slurry was used to coat aluminum substrates (250 cells per square inch), 1" (height) and 1.5" (diameter) coated to 1.1 g/in³ catalyst. The coated monolith was dried at 90° C. for 2 hours and calcined at 140° C. for 2 hours. The testing conditions were: an unpurified air flow stream (36 L/min) having about 2 ppm formaldehyde, 20% relative humidity in air at 30° C. was directed over the catalyst. The initial formaldehyde conversion was 97%, and 37% after 3 hours.

Example 19

77.8 g of ceria, 21.5 g sodium carbonate (0.002% NaCl impurity), and 328 g of manganese oxide polymorph I were dispersed in 550 g of water, and a solution of 13 g alumina sol and 9.6 g acetic acid in 50 g water was added to the resulting slurry. 0.8 g of a dispersant was added. This slurry was used to coat aluminum substrates (250 cells per square inch), 0.75" (height) and 1.5" (diameter) coated to 1.1 g/in³ catalyst. The coated monolith is dried at 90° C. for 2 hours and calcined at 140° C. for 2 hour. The testing conditions were: an unpurified air flow stream (36 L/min) having about 2 ppm formaldehyde, 20% relative humidity in air at 30° C. was directed over the catalyst. The initial formaldehyde conversion was 94%, and 70% after 2 hours.

Example 20: Catalyst with Polytetrafluoroethylene (PTFE) Binder 0.25 g of dispersant was dissolved in 170 g of water. While mixing, 24.3 g of ceria was added to the stirred solution, followed by 104 g of manganese oxide polymorph I and 6.7 g of sodium carbonate monoxide salt. 4.5 g of PTFE binder (60% wt dispersion in water) was added to the slurry with vigorous mixing followed by adding 16.5 g of a solution of carbohydrate based thickener. This slurry was used to coat aluminum substrates (250 cells per square inch), 0.8" (height) and 1.5" (diameter) coated to 1.4 g/in³ catalyst. The coated monolith was dried at 90° C. for several hours. The testing conditions were: an unpurified air flow stream (38 L/min) having about 2 ppm formaldehyde, 20% relative humidity in air at 30° C. was directed over the catalyst. The initial formaldehyde conversion was 90%, and 58% after 3 hours.

Example 21: Catalyst with PTFE Binder 1 g of dispersant was dissolved in 315 g of water. While mixing, 253 g of manganese oxide polymorph I was added to the stirred solution followed by 27.45 g of potassium hydroxide. The pH of the solution was adjusted to 9 with ammonium hydroxide prior to adding 33.1 g of PTFE binder (60% wt dispersion in water) to the slurry with vigorous mixing. Then a solution of 32.6 g of carbohydrate based thickener was added to the vigorously mixed slurry. This slurry was used to coat aluminum substrates (250 cells per square inch), 0.8" (height) and 1.5" (diameter) coated to 1.7 g/in³ catalyst. The coated monolith was dried at 90° C. for several hours. The testing conditions were: an unpurified air flow stream (38 1/min) having about 2 ppm formaldehyde, 20% relative humidity in air at 30° C. was directed over the catalyst. The initial formaldehyde conversion was 95%, and 58% after 3 hours.

Example 22: Catalyst with Styrene-Acrylic Binder 1 g of dispersant was dissolved in 229 g of water. While stirring, 46 g of ceria was added to the resulting solution followed by 198 g of manganese oxide polymorph I. While mixing well, 35 g of sodium hydroxide was added. 25.1 g of styrene-acrylic binder (50% wt. dispersion in water) was added to the slurry with vigorous mixing. This slurry was used to coat aluminum substrates (250 cells per square inch), 0.8" (height) and 1.5" (diameter) coated to 1.3 g/in³ catalyst. The coated monolith was dried between 110° C. and 140° C. for several hours. The testing conditions were: an unpurified air flow stream (38 1/min) having about 2 ppm formaldehyde, 20% relative humidity in air at 30° C. was directed over the catalyst. The initial formaldehyde conversion was 96%, and 58% after 3 hours.

Example 23: Catalyst with Styrene-Acrylic Binder 0.24 g of carbohydrate based thickener was dispersed in 16.9 g of water followed dispersing 0.24 g of surfactant in 121.2 g of water in another container, followed by adding the pre-prepared thickener solution. While stirring, 101.9 g of manganese oxide polymorph I was added to the resulting solution followed by 8.4 g of sodium hydroxide. 36.0 g of styrene acrylic binder (50% wt dispersion in water) was added to the slurry with vigorous mixing followed by adding 7.9 g of rinse water. This slurry was used to coat aluminum honeycomb and PU foam substrates 0.8" (height) and 1.5" (diameter) coated to 1 g/in³ catalyst. The coated substrate was dried at 90° C. for several hours. The testing conditions for coated aluminum were: an unpurified air flow stream (38 1/min) having about 2 ppm formaldehyde, 20% relative humidity in air at 30° C. was directed over the catalyst. The initial formaldehyde conversion was 70%, and 38% after 3 hours.

Example 24: Catalyst with No Chloride or Sulfate Impurities 1 g of dispersant was dissolved in 255 g of water followed by 39.6 g potassium carbonate salt. 230 g of manganese oxide polymorph I were added to the slurry. 30 g of a styrene acrylic binder was then added to the slurry followed by ammonium hydroxide to adjust the pH to 9. This slurry was used to coat aluminum monolithic substrates (225 cpsi). Afterwards the coated monolith was dried at 90° C. for 2 hours. The coating was repeated until the weight gain of the monolithic substrate was 2 g/in³.

Example 25 Catalyst with 0.25% Potassium Chloride Impurity 1 g of dispersant was dissolved in 255 g of water followed by 39.6 g potassium carbonate salt (0.25% potassium chloride impurity). 230 g of manganese oxide polymorph I were added to the slurry. 30 g of a styrene acrylic binder was then added to the slurry followed by ammonium hydroxide to adjust the pH to 9. This slurry was used to coat aluminum monolithic substrates (225 cpsi). Afterwards the coated monolith was dried at 90° C. for 2 hours. The coating was repeated until the weight gain of the monolithic substrate was 2 g/in$^3$.

Example 26: Catalyst with 0.5% Potassium Chloride Impurity 1 g of dispersant was dissolved in 255 g of water followed by 39.6 g potassium carbonate salt (0.5% potassium chloride impurity). 230 g of manganese oxide plymorph I were added to the slurry. 30 g of a styrene acrylic binder was then added to the slurry followed by ammonium hydroxide to adjust the pH to 9. This slurry was used to coat aluminum monolithic substrates (225 cpsi). Afterwards the coated monolith was dried at 90° C. for 2 hours. The coating was repeated until the weight gain of the monolithic substrate was 2 g/in$^3$.

Example 27: Catalyst with 0.5% Potassium Sulfate Impurity 1 g of dispersant was dissolved in 255 g of water followed by 39.6 g potassium carbonate salt (0.5% potassium sulfate). 230 g of manganese oxide polymorph I were added to the slurry. 30 g of a styrene acrylic binder was then added to the slurry followed by ammonium hydroxide to adjust the pH to 9. This slurry was used to coat aluminum monolithic substrates (225 cpsi). Afterwards the coated monolith was dried at 90° C. for 2 hours. The coating was repeated until the weight gain of the monolithic substrate was 2 g/in$^3$.

Figure 10:
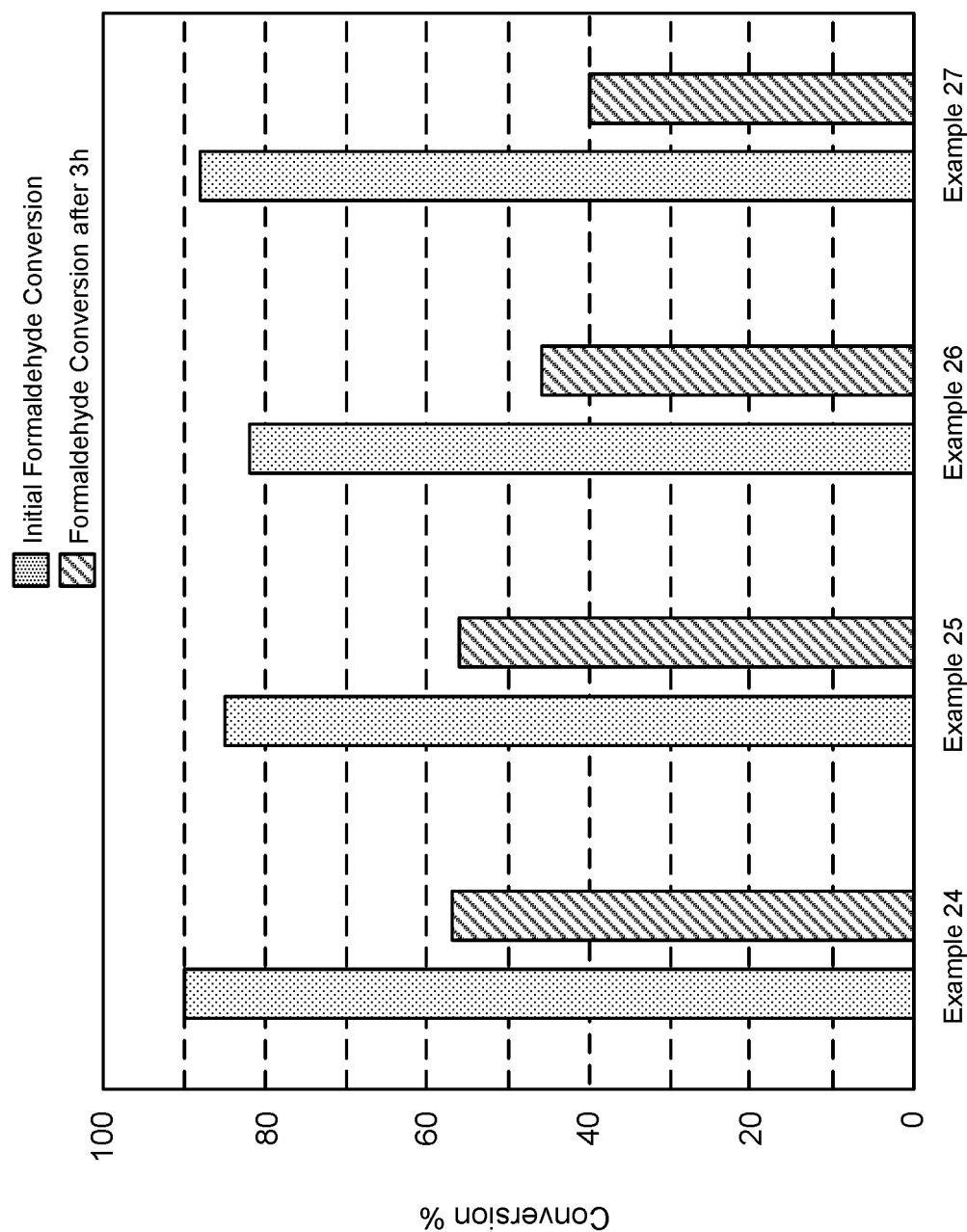
FIG. 10 is a plot depicting formaldehyde conversion for various catalyst compositions described in examples 24-27.

FIG. 10 shows a formaldehyde conversion comparison of catalyst compositions prepared according to examples 24-27. The coated aluminum (250 cpsi) was 1.6" (height) and 1" (diameter) coated with 2 g/in$^3$ catalyst. The operation conditions were: an unpurified air flow stream (34 L/min) having about 5 ppm formaldehyde, 20% relative humidity in air at 30° C. The conversion values depicted in FIG. 10 are initial and after 3 hours.

Example 28: Preparation of Catalyst Filter Sheet 92.5 g of potassium modified MnOx powder and 7.5 g of PTFE powder were dosed into a cylindrical 1 liter. The container was placed on a roll mixer for 1 hour at 60 rpm. Subsequently, 1.5 kg of 8 mm steel balls were added and the container was again placed on the roll mixer for 5 min. The material was removed from the container and the steel balls were separated using a 5 mm mesh stainless steel wire sieve. The material was then dosed onto a linear conveyor belt. The material was calendered into a film by 6 brass rolls with a diameter of 60 mm and a linear force of 1.2 kN/m. The resulting film was cut into sheets of 5×25 cm. Two sheets were placed on top of each other manually and laminated together by compressing the sheet to a thickness of 1 mm using a 60 mm diameter brass cylinder and 1 mm PTFE ships for thickness control. This step was repeated 10 times.

The resulting free standing film had a density of 1.08 g/cm$^3$ and a thickness of 1 mm and was cut to a width of 25 mm and 200 mm length. Three of these sheets were corrugated using a flat brass matrix at a pressure of ~1 MPa.

The corrugated sheet was positioned on top of flat sheet and this stack was rolled up manually to fit into a cylindrical sample holder with an inner diameter of 34 mm and a length of 20 mm. The total mass of the catalyst film was 12.6 g. The testing conditions for the filter: an unpurified air flow stream (33 l/min) having about 2 ppm formaldehyde, 20% relative humidity in air at 30° C. The initial formaldehyde conversion was 70%, and 55% after 3 hours.

Example 28: Catalyst for Ozone Testing 1 g of dispersant was dissolved in 213 g of water followed by 31 g potassium carbonate salt and 16.3 g of a 45% potassium hydroxide solution. 230 g of manganese oxide polymorph I was added to the slurry followed by 30 g of a styrene acrylic binder. This slurry was used to coat aluminum monolithic substrates (225 cpsi). Afterwards the coated monolith was dried at 90° C. for 2 hours. The coating was repeated until the weight gain of the monolithic substrate was 2 g/in$^3$ Testing of Catalyst for Ozone Conversion The catalysts of examples 15 (2 g/in$^3$ loading) and 29 were fitted in the tube of a plug flow reactor and operated with a feed gas containing the specified concentration of ozone in air at a dew point of 15° C. at either 30° C. or 75° C. gas temperature. The ozone concentration was measured with an UV photometric analyzer (Tanabyte model 722, US EPA Equivalent Method EQOA-0407-165). The gas flow rate (at room temperature) was set to achieve space velocities of 200,000-800,000 h$^{-1}$. The results are listed in Table 2. High ozone conversion was achieved, even at low temperature and high flow rates.

TABLE 2

| | Ozone conversion performance | | |
|---|---|---|---|
| Space velocity [×10$^3$ h$^{-1}$] | Example 15 (2 g/in$^3$) Conversion at 250 ppb O$_3$ | Example 28 Conversion at 250 ppb O$_3$ | Example 15 (2 g/in$^3$) Conversion at 800 ppb O$_3$ |
| | T = 75° C. | | |
| 200 | 87.4% | 84.2% | 87.9% |
| 400 | 69.4% | 64.9% | 69.7% |
| 600 | 58.4% | 53.9% | 58.3% |
| 800 | 54.1% | 47.6% | 51.6% |
| | T = 30° C. | | |
| 200 | 80.6% | 76.6% | 77.1% |
| 400 | 61.8% | 56.0% | 57.6% |
| 600 | 49.6% | 41.7% | 47.0% |
| 800 | 43.7% | 37.4% | 40.4% |

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. A catalyst composition comprising:
   manganese oxide;
   bentonite from about 40 wt % to about 50 wt % based on a total weight of the catalyst composition; and
   a polymer binder comprising poly(tetrafluoroethylene), acrylic/styrene acrylic copolymer latex, or a combination thereof,
   wherein the catalyst composition is disposed on a substrate selected from a polymer substrate, a foam substrate, a paper substrate, a nonwoven filter, a paper filter, a fibrous filter, or a combination thereof, and
   wherein the catalyst composition is adapted to remove one or more of formaldehyde, ozone, carbon monoxide, nitrogen oxide, amines, sulfur compounds, thiols, chlorinated hydrocarbons, or volatile organic compounds from an unpurified air supply, and wherein a BJH pore volume of the catalyst composition ranges from about 0.3 mL/g to about 1.5 mL/g.

2. The catalyst composition of claim 1, wherein the polymer binder further comprises a polymer selected from a group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), polyvinylidene fluoride, poly(vinlyfluoride), ethylene chlorotrifluoroethylene copolymer, polyamide, phenolic resins, polyurethane, silicone polymers, and combinations thereof.

3. The catalyst composition of claim 1, wherein the manganese oxide comprises cryptomelane, birnessite, vernadite, manganese oxide polymorph I, poorly crystalline cryptomelane, amorphous manganese oxide, polymorphs thereof, or mixtures thereof.

4. The catalyst composition of claim 1, wherein a chloride content of the catalyst composition is less than 1 wt % based on a total weight of the catalyst composition, or wherein a sulfate content of the catalyst composition is less than 1 wt % based on a total weight of the catalyst composition.

5. The catalyst composition of claim 1, further comprising an inorganic oxide comprising one or more of ceria, zirconia, silica, titania, alumina, iron, lanthanum, praseodymium, samarium.

6. An air filter comprising the catalyst composition of claim 1, wherein the air filter is adapted for use in a portable air purifier, a heating, ventilation, and air conditioning (HVAC) system, a motor vehicle, a railed vehicle, a watercraft, an aircraft, or a spacecraft.

7. A catalyst device adapted to remove one or more of formaldehyde, ozone, carbon monoxide, nitrogen oxide, amines, sulfur compounds, thiols, chlorinated hydrocarbons, or volatile organic compounds from an unpurified air supply, the catalyst device comprising:
   a housing;
   a substrate disposed within the housing, wherein the substrate is selected from a polymer substrate, a foam substrate, a paper substrate, a nonwoven filter, a paper filter, a fibrous filter, or a combination thereof; and
   a catalyst composition disposed in the housing, wherein the catalyst composition comprises manganese oxide, bentonite from about 40 wt % to about 50 wt % based on a total weight of the catalyst composition, and a polymer binder comprising poly(tetrafluoroethylene), acrylic/styrene acrylic copolymer latex, or a combination thereof, wherein a BJH pore volume of the catalyst composition ranges from about 0.3 mL/g to about 1.5 mL/g.

8. The catalyst device of claim 7, wherein the polymer binder further comprises a polymer selected from a group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), polyvinylidene fluoride, poly(vinlyfluoride), ethylene chlorotrifluoroethylene copolymer, polyamide, phenolic resins, polyurethane, silicone polymers, and combinations thereof.

9. The catalyst device of claim 7, wherein the manganese oxide comprises cryptomelane, birnessite, vernadite, manganese oxide polymorph I, poorly crystalline cryptomelane, amorphous manganese oxide, polymorphs thereof, or mixtures thereof.

10. The catalyst device of claim 7, wherein a chloride content of the catalyst composition is less than 1 wt % based on a total weight of the catalyst composition, or wherein a sulfate content of the catalyst composition is less than 1 wt % based on a total weight of the catalyst composition.

11. The catalyst device of claim 7, further comprising an inorganic oxide comprising one or more of ceria, zirconia, silica, titania, alumina, iron, lanthanum, praseodymium, samarium.

12. The catalyst device of claim 7, wherein the catalyst device is incorporated into an air filter of a device selected from a group consisting of: a portable air purifier, a heating, ventilation, and air conditioning (HVAC) system, a motor vehicle, a railed vehicle, a watercraft, an aircraft, and a spacecraft.

13. A method of preparing a catalyst coating, the method comprising:

mixing manganese oxide, bentonite, and a polymer binder in water to form a slurry, the polymer binder comprising poly(tetrafluoroethylene), acrylic/styrene acrylic copolymer latex, or a combination thereof; and depositing the slurry onto a substrate to form the catalyst coating on the substrate, wherein the substrate selected from a polymer substrate, a foam substrate, a paper substrate, a nonwoven filter, a paper filter, a fibrous filter, or a combination thereof, wherein a BJH pore volume of the catalyst coating ranges from about 0.3 mL/g to about 1.5 mL/g, wherein the bentonite is present from about 40 wt % to about 50 wt % based on a total weight of the catalyst coating.

14. The method of claim 13, wherein the polymer binder further comprises a polymer selected from a group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), polyvinylidene fluoride, poly(vinlyfluoride), ethylene chlorotrifluoroethylene copolymer, polyamide, phenolic resins, polyurethane, silicone polymers, and combinations thereof.

15. The method of claim 13, wherein the manganese oxide comprises cryptomelane, birnessite, vernadite, manganese oxide polymorph I, poorly crystalline cryptomelane, amorphous manganese oxide, polymorphs thereof, or mixtures thereof.

16. A catalyst composition comprising:
manganese oxide comprising cryptomelane;
bentonite from about 40 wt % to about 50 wt % based on a total weight of the catalyst composition; and
a polymer binder, wherein the catalyst composition is adapted to remove one or more of formaldehyde, ozone, carbon monoxide, nitrogen oxide, amines, sulfur compounds, thiols, chlorinated hydrocarbons, or volatile organic compounds from an unpurified air supply, and wherein a BJH pore volume of the catalyst composition ranges from about 0.3 mL/g to about 1.5 mL/g,
wherein the catalyst composition is disposed on a substrate selected from a polymer substrate, a foam substrate, a paper substrate, a nonwoven filter, a paper filter, a fibrous filter, or a combination thereof.

* * * * *